US009891504B2

(12) United States Patent
Fromm

(10) Patent No.: US 9,891,504 B2
(45) Date of Patent: Feb. 13, 2018

(54) HOLDING ASSEMBLY FOR A CAMERA

(71) Applicant: Wayne Fromm, Richmond Hill (CA)

(72) Inventor: Wayne Fromm, Richmond Hill (CA)

(*) Notice: Subject to any disclaimer, the term of this patent is extended or adjusted under 35 U.S.C. 154(b) by 0 days.

(21) Appl. No.: 15/298,929

(22) Filed: Oct. 20, 2016

(65) Prior Publication Data

US 2017/0068149 A1 Mar. 9, 2017

Related U.S. Application Data

(63) Continuation-in-part of application No. 14/849,113, filed on Sep. 9, 2015, now Pat. No. 9,606,424.

(51) Int. Cl.
| | | |
|---|---|---|
| *G03B 17/00* | (2006.01) | |
| *G03B 17/56* | (2006.01) | |
| *F16M 13/02* | (2006.01) | |
| *F16M 11/26* | (2006.01) | |
| *F16M 11/04* | (2006.01) | |
| *F16M 11/10* | (2006.01) | |
| *F16M 11/14* | (2006.01) | |
| *F16M 11/28* | (2006.01) | |
| *F16M 11/32* | (2006.01) | |

(52) U.S. Cl.
CPC ......... *G03B 17/561* (2013.01); *F16M 11/041* (2013.01); *F16M 11/10* (2013.01); *F16M 11/14* (2013.01); *F16M 11/26* (2013.01); *F16M 11/28* (2013.01); *F16M 11/32* (2013.01); *F16M 13/02* (2013.01); *F16M 13/022* (2013.01); *G03B 17/563* (2013.01); *G03B 17/566* (2013.01)

(58) Field of Classification Search
USPC .................. 396/428; D14/250, 251, 253
See application file for complete search history.

(56) References Cited

U.S. PATENT DOCUMENTS

| 7,684,694 | B2 | 3/2010 | Fromm | |
|---|---|---|---|---|
| D679,693 | S | * 4/2013 | Rashid | ............ D14/250 |
| 8,757,901 | B2 | 6/2014 | Fromm | |
| D716,044 | S | * 10/2014 | Wilk | ............... D3/247 |
| 9,179,565 | B2 | * 11/2015 | Cho | ............ H05K 7/00 |
| 9,219,516 | B2 | * 12/2015 | Haymond | ......... H04B 1/3888 |
| D765,662 | S | * 9/2016 | Kang | ............ D14/251 |
| D767,555 | S | * 9/2016 | Lee | ................. D14/253 |
| D773,803 | S | * 12/2016 | Larsen | ............ D14/253 |
| 2008/0117328 | A1 | 5/2008 | Daoud | |

(Continued)

FOREIGN PATENT DOCUMENTS

WO WO 2014146151 A1 * 9/2014 ............. B62J 11/00

*Primary Examiner* — Rodney Fuller
(74) *Attorney, Agent, or Firm* — Vincent G. LoTempio; Kloss, Stenger & LoTempio; David T. Stephenson

(57) ABSTRACT

A mounting device and system for holding a camera or tool on a surface or a tripod. A camera holder has an upper panel that folds open to expose an adhesive surface on an upper panel to adhere to a wall, while the bottom panel holds metal objects, such as a camera or tools that will attach to a magnetic surface. A tripod adapter for mounting the camera holder has a pocket designed to match the shape of the camera holder for mounting, while leaving the front surface of the camera holder exposed for attachment of the camera. A flexible wraparound silicon or rubber camera adapter or grip can be attached to the camera holder to hold the camera through an elastic grip, rather than magnetic or adhesive means of attachment.

15 Claims, 31 Drawing Sheets

(56) References Cited

U.S. PATENT DOCUMENTS

| | | |
|---|---|---|
| 2009/0010637 A1 | 1/2009 | DeWitt |
| 2011/0116782 A1 | 5/2011 | Dean |
| 2012/0091312 A1* | 4/2012 | Baker .................... F16M 13/00 248/682 |
| 2013/0248569 A1* | 9/2013 | Hsu ........................ B62J 11/00 224/440 |
| 2016/0281919 A1* | 9/2016 | Kofler ..................... B62J 11/00 |
| 2017/0120980 A1* | 5/2017 | Karl ........................ B62J 11/00 |

* cited by examiner

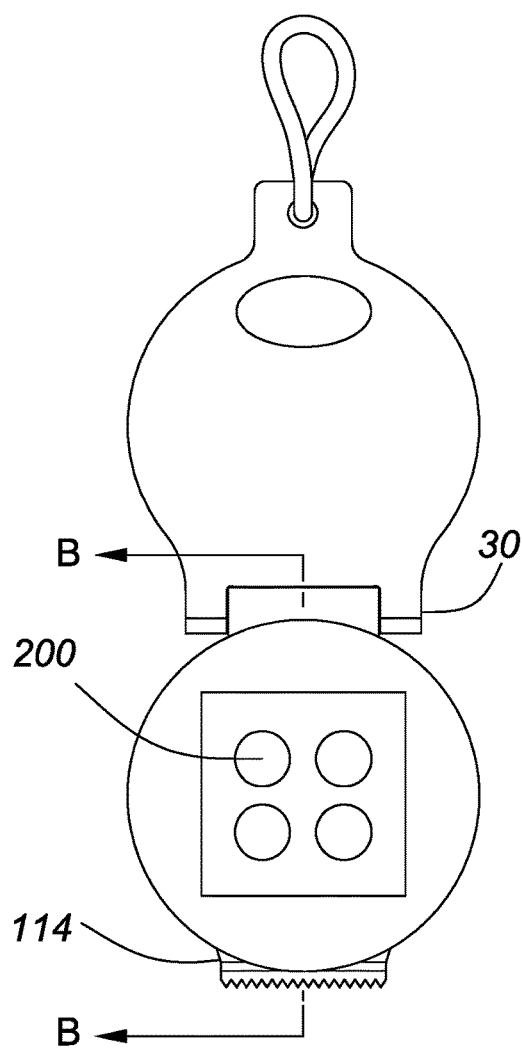 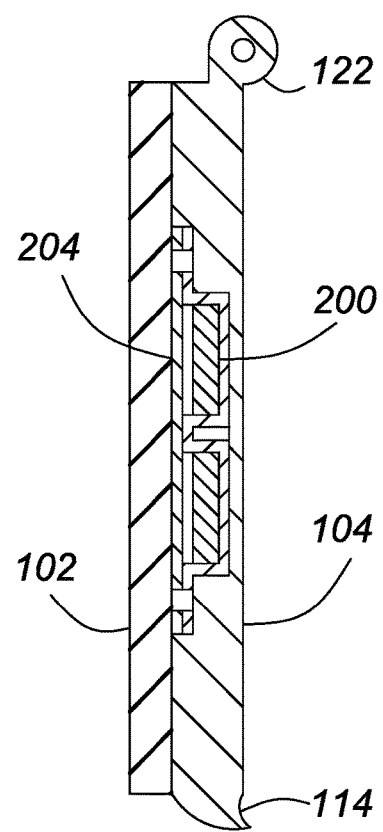
FIG. 20A          FIG. 20B

HOLDING ASSEMBLY FOR A CAMERA

RELATED APPLICATIONS

This application is a continuation-in-part from application Ser. No. 14/849,113 filed on Sep. 9, 2015, which is a continuation-in-part of application Ser. No. 14/588,218 filed on Dec. 31, 2014.

FIELD

The present disclosure relates to a holding assembly for hanging a camera on a support surface. The camera may be hung on a wide variety of surfaces and the holding assembly for the camera is easily transportable. A hook, tether or adhesive may be used as a means to temporarily mount the device on a vertical support. The device is ideal for use with smartphones and digital cameras. The design allows for easy attachment without damaging the surface on which the device is mounted.

The present disclosure further relates to a tripod adapter for holding a camera adapter on an adjustable tripod to hold the camera in a stable and adjustable position taking pictures or video.

The present disclosure also relates to a rectangular adapter that can hang on a support surface, such as a wall, to hold tools. The rectangular tool holding apparatus is similar to one embodiment of the camera holder, in that it contains magnets embedded below the surface of a lower device attachment panel, while the upper panel flips open to expose an adhesive surface that makes contact with a support surface.

Additionally, the present disclosure relates to a flexible wraparound silicon camera adapter or grip. The wraparound grip attaches to a rigid support attachment component that flips open to expose an adhesive on an upper panel of the support attachment component to a support such as a wall, or alternatively, the support attachment component may adapt to a tripod.

BACKGROUND

The increase in popularity of digital cameras, particularly those incorporated into mobile phones, has given rise to a number of devices that allow a user to support the camera while also being included in a picture. Camera is defined herein as any device for taking pictures or video, such as a smartphone, digital camera and the like.

Examples of this type of hand held camera support can be seen in U.S. Pat. Nos. 7,684,694 and 8,757,901 and U.S. patent application publication number 2008/0117328. These hand held supporting devices work well for certain types of photographs, taken under particular conditions. Such devices, however, have limitations. For example, a user may wish to take a photograph from a greater distance than is practical for a hand held device. Further, a hand held device, particular when extended to greater lengths, is prone to shaking while a user is taking a picture, leading to blurring of the photograph. Further, the arm and stick are usually seen in the captured image, particularly in shots where the rod is fully extended.

A traditional device designed to overcome the limitations of hand held camera supports is the tripod. Tripods allow for stationary and stable picture taking at greater distances; however, they are generally bulky and inconvenient to carry. Further, a tripod often requires a stable or flat surface for support, which may not be available in certain locations. Additionally, a tripod takes time to set up and decreases the spontaneity which a photographer may wish to capture.

To overcome the limitations of a tripod, supports for mounting a camera on a stationary object such as a tree or post have been developed. Examples of such devices can be seen in U.S. patent application publication numbers 2009/0010637 and 2011/0116782. Most hangers currently in the marketplace have a channel through which an elongated fastener, such as a nail or pin, is inserted prior to the pin being driven into the support surface. These types of stationary support devices utilize stationary objects in the environment for supports, such as a trees and posts, to which the device is fastened.

The '637 application discloses an elongated piece to which a camera is attached. The elongated piece is mounted to a generally wooden or penetrable surface, by using penetrating members similar to pins, nails or staples. The limitations of the '637 device include potential damage to surfaces to which the device is mounted and the difficulty of forcing the penetrating member into the support surface.

The '782 application similarly discloses a device for attachment to a tree or a wooden, penetrable surface. The '782 device utilizes a screw or pin to penetrate the surface and support an elongate boom, to which a camera is attached at the end. Much the like the '637 device, the limitations of the '782 device include potential damage to a surface to which the device is mounted and the difficulty of inserting the pin into the surface. Additionally, the complexity of the '782 device requires a set-up time that could reduce the spontaneity of a picture. Further, devices like those described in the '637 and '782 applications are difficult to reposition if the photograph does not come out as planned.

Another solution known in the art designed to overcome the limitations of a tripod include attaching a double sided adhesive or hook and loop fastener strip directly to the camera. Once applied to the camera, the adhesive strip allows the camera to be attached to a vertical surface, or in the case of a hook and loop device, to the complementary hook and loop attachment strip on the vertical support surface. Attaching an adhesive strip directly to the camera, however, may leave damaging residue on the camera, even when the strip is designed to be removable.

Further, a camera is not flexible, so attaching a strip directly to the camera inhibits the ability of the user to mount the device on an irregular support surface. While an adhesive strip attached directly to the camera overcomes the problem of tripod inconvenience, it is clear that this approach has a number of limitations preventing it from being an effective solution to the problem that the present disclosure overcomes. For existing camera supports, use of an adhesive strip, nano suction or hook and loop fastener, does not allow the camera lens to be variably angled. A further problem with existing camera supports that use nano suction is that smartphone cases that have a nano suction back require the user to acquire a new case.

SUMMARY

In light of the problems associated with the known camera mounting devices, it is a principal object of the invention to provide a camera support that is capable of being mounted on a wide variety of surfaces. Further, the device of the present disclosure will not damage the mounting surface, and is lightweight and compact in size. The length of the device may be altered to suit the needs of the user and can be easily adjusted for positioning at eye level.

In one embodiment, one end the device is provided with removable ball-joint/camera mount assembly. This ball-joint mount assembly may receive a smartphone or another type of camera. The other end of the support is provided with a hanger, or adapter, which can be separated from the device when necessary.

The hanger may be in the form of a hook or adhesive. The hook may be a flat hook formed from sheet metal or the like. The hanger may be located adjacent a handle or grip, or, alternatively, may be located adjacent to a ball/joint assembly mounted at one end of the rigid support. Alternatively the hanger may be located adjacent to a ball-joint assembly mounted directly to a non-extendable rigid support.

A photographer could be at a party in a hotel room, in a backyard, at a tailgate party or the like and seek to be included in a selfie, a group photograph or video and also wants more background than a handheld camera would provide. This problem could be overcome by the use of a tripod, but the photographer may not have a tripod to mount the picture taking device, or a convenient surface on which to mount the tripod may not be available. In addition, a photographer may not have the time to set-up a tripod mounted device.

The solution to this problem is achieved by the present disclosure, which may include as its principal components a rigid support having variable lengths; the support having a hook at one end, and a ball-joint assembly mounted on the other end to which a camera may be affixed.

Alternatively the present invention may include a rigid support which may have different lengths, the support having a ball-joint at one end which may support a picture taking device and a further ball-joint assembly at the other end to which a suspension structure may be secured.

In one embodiment of the present disclosure, the holding assembly has two sections that fold together. One section has an attachment surface for affixing the device to a support and the other section has an attachment surface for affixing the device to a camera. Each surface, or only one surface, may have a reusable and washable adhesive section, which leaves no residue on the support or camera with which it comes into contact. When in the closed position, the washable adhesive surface is protected from ultraviolet (UV) radiation and dirt. In addition, the camera attachment section is attached to a rigid serrated grip that contacts the support and provides additional stability to the holding assembly. Alternatively, the camera attachment section may have magnets behind the camera attachment surface to hold the camera in place.

For existing camera supports, use of an adhesive strip, nano suction or hook and loop fastener, does not allow the camera lens to be variably angled. The device of the present disclosure can be adjusted to hold its position at various angles when the joint or hinge is set with sufficient resistance. A further disadvantage of existing gel and hook and loop fasteners is that they may pick up dirt or lint. Some existing smartphone cases have a nano suction backing; however, this requires the user to acquire a new case.

For the present disclosure, when the magnet is replaced by sticky gel, the user can select either the front or rear facing lens of the smartphone. This is not practical or possible with other approaches. One embodiment of the present disclosure has two gel surfaces. When the flip case is opened, one gel surface attaches to a surface such as a tree and the other gel surface (replacing the magnet) holds the smartphone. This allows for both rear and front facing photography. The magnet apparatus can only be used effectively for front facing images as a steel plate must be attached to the back of the phone or between the smartphone and the case. However, the sticky gel can attach to the back of the phone, back of the cover, or front of the phone.

The camera shutter in the present disclosure may be triggered by a timer, remote control, a voice command, or it can be set to operate in a continuous mode. In addition, new cameras and smartphones may automatically sense the orientation and produce a right side up image for the person to use the screen display for centering.

Further, in one embodiment of the present invention, tripod connecting adapter (TCA) can be adapted to be used with any standard tripod and may work with a wide variety of hand held media devices through connecting a camera adapter to the tripod adapter. The camera adapter is capable for separate use without the tripod by attaching to a support such as a wall with an adhesive backed upper panel.

When in use with the tripod connecting adapter, the camera adapter, or camera holding assembly, is maintained in a closed state and fits into a pocket, or cavity, in the tripod connecting adapter. The present tripod connecting adapter may be comprised of a semi-rigid or rigid rubber, metal or plastic that is that may be mounted on all standard tripod bolts, or any device or armature that features a ¼" bolt or equivalent.

Further, in an additional embodiment of the present invention, the camera holding assembly, or camera adapter, may further attach to a flexible wraparound camera grip configured to attach centrally to the generally round camera holding assembly. The camera holding assembly may have an adhesive or magnetic means of attaching the camera to the camera holding assembly in addition to the flexible camera grip. A system is disclosed where the camera holding assembly attaches to a flexible camera adapter which attaches to the camera, while the camera holding assembly is mounted either on a support surface or a tripod.

BRIEF DESCRIPTION OF THE DRAWINGS

FIG. 20A shows a cross-sectional front view of one embodiment of the holding assembly illustrating the magnets in the camera attachment panel.

FIG. 20B shows a cross-sectional side view of one embodiment of the holding assembly illustrating the magnets in the camera attachment panel.

DETAILED DESCRIPTION

Figure 1:
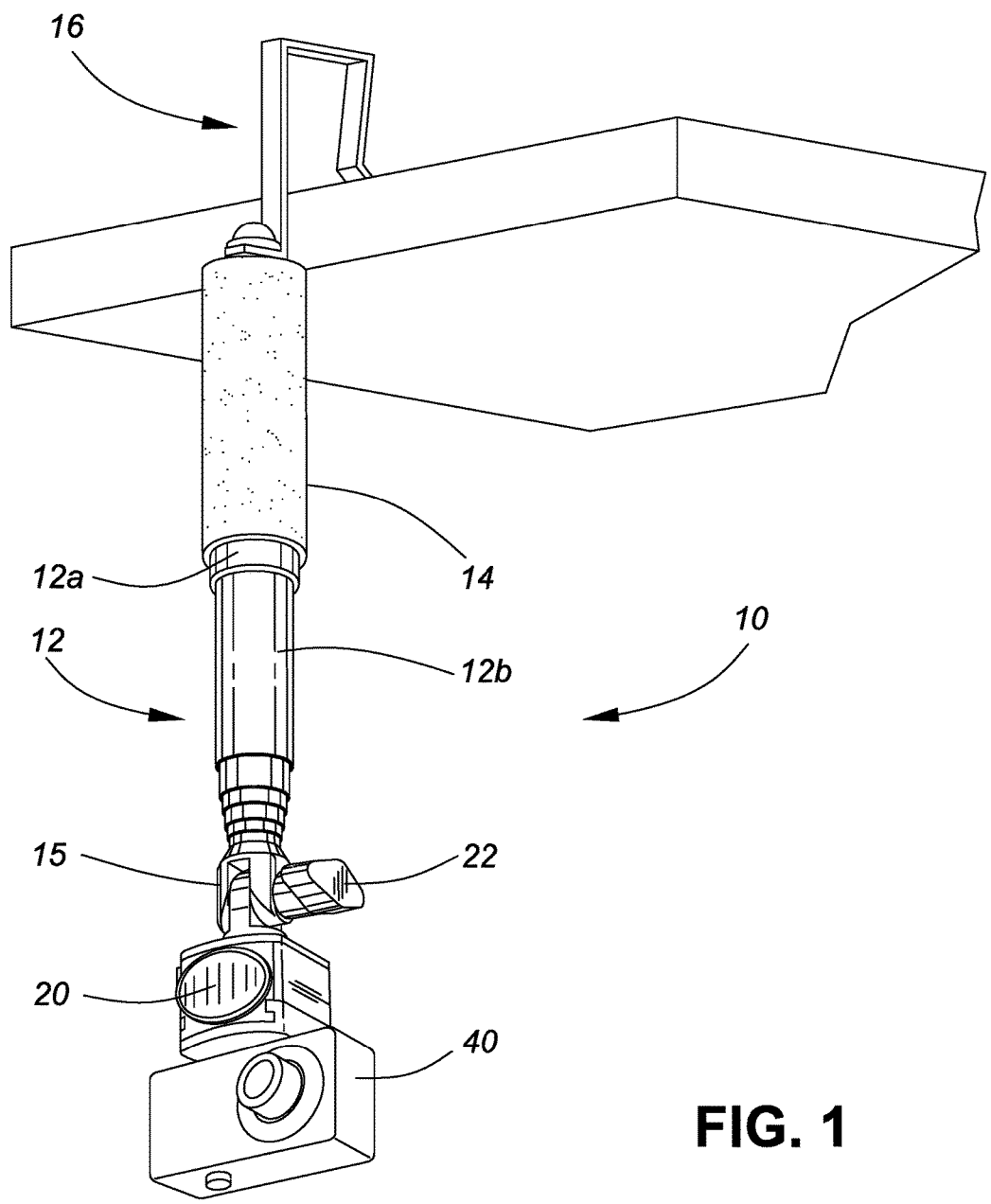
FIG. 1 is a perspective view showing the holding assembly of this disclosure when hooked to a shelf, the holding assembly including a rigid rod shown in a retracted position; the holding assembly carrying a camera secured to a ball-joint assembly and also carrying at the other end a suspension structure in the form of a hook.

With reference now to the various figures, one embodiment of the holding assembly 10 is shown in FIG. 1. Here, holding assembly 10 is shown holding a camera 40. The holding assembly 10 is preferably formed of an adjustable rigid support, which in the preferred embodiment is a telescopic rod 12, shown in FIG. 1. The telescopic rod has telescopic units 12a, 12b . . . 12n which may be locked in various positions of length adjustment. The telescopic rod has a first end distal from a second end.

As shown in FIG. 1, the first end has telescoping unit 12a, which is of the largest diameter, and is connected to a handle 14. The second end 12n is provided with removable ball-joint assembly 15. In the embodiment shown in FIG. 1 a camera 40 is secured to the ball-joint assembly 15. To attach holding assembly 10 to a generally horizontal support surface, as shown in FIG. 1, a C-shaped hook 16, which may be formed from sheet metal, plastic, or the like, may be removably attached to the handle 14 of the support 10 by a screw or attachment means known to one of skill in the art.

Figure 2:
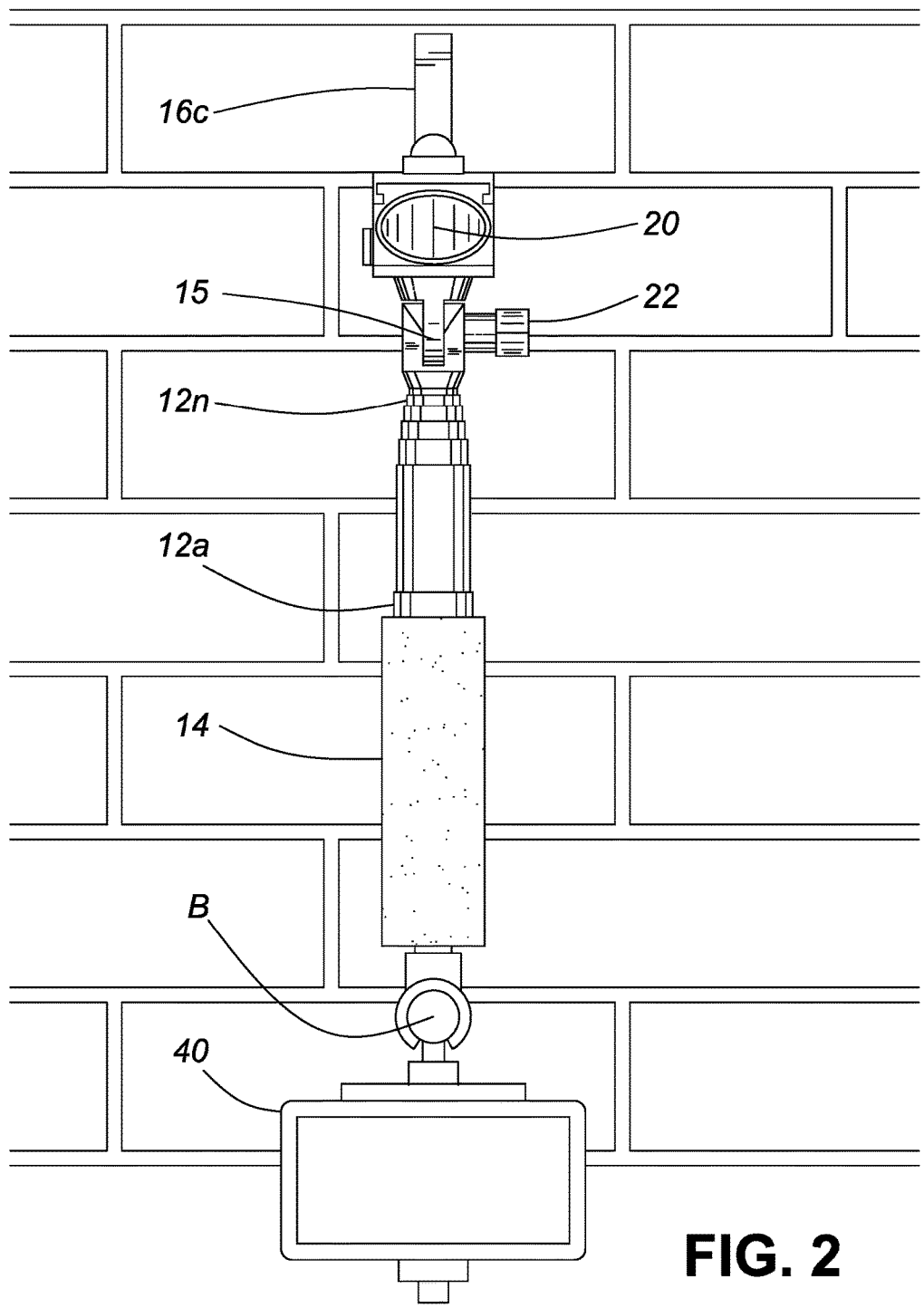
FIG. 2 is a front view showing the holding assembly hung from the top surface of a brick in a brick wall; the holding assembly being in a substantially retracted position and carrying a smartphone. In this view the ball-joint assembly is secured adjacent the handle, and the suspension structure being carried by a further ball-joint assembly adjacent the other end.

Alternatively, the C-shaped hook 16 may be secured to the ball-joint assembly 15 as shown in FIG. 2. The C-shaped hook 16 has a first vertically extending section 16a provided with a lower horizontal tab portion 16b which may be secured to the first end of the rigid telescoping sections which first end will become the upper end when the support is placed in its normal operating position. A ball joint B may be used to attach camera mount to telescopic rod 12.

Figure 3:
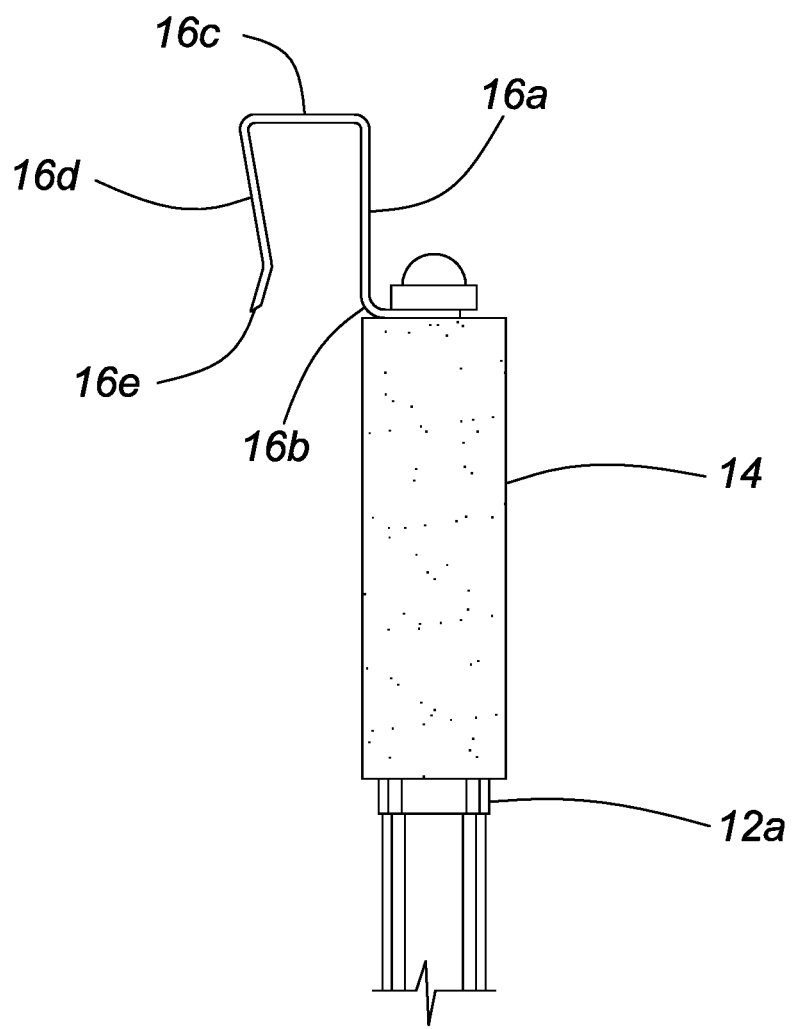
FIG. 3 is a side view of a portion of the holding assembly shown in FIG. 1 showing the hook.

As shown in FIG. 3, the C-shaped hook 16 is also provided with an upper transverse section 16c, and a downwardly extending section 16d secured to the upper transverse section and spaced away from the and generally parallel to the vertically extending section 16a. The downwardly extending section 16d is provided with an elongated lower contact surface 16e which is angled toward the support when in the normal operating position as shown in FIG. 3.

Elongated lower contact surface 16e may be placed on virtually any horizontal structure to hold the support of the device of the present disclosure. The tail of the hook in elongated lower contact surface 16e is very important; where narrower shapes are more effective, as elongated lower contact surface 16e has to grip mortar on brick walls and behind narrow spaces, and thus lower contact surface 16e may have a chisel shape.

In the embodiment show in FIG. 2 the handle 14 is used to grip the holding assembly, pushing the apparatus skyward and unhooking it from the overhead support surface. In the embodiment of FIG. 1, the camera 40 or the ball joint assembly 15 is grasped by the user to push the holding assembly 10 upwardly to release the C-shaped hook 16 from the surface to which it is engaged.

FIG. 1 shows the holding assembly 10 having a camera 40 secured to a ball-joint assembly 15 which in turn is secured to one end of telescopic rod 12. The other end of the support may carry a C-shaped hook 16, which in turn may engage various surfaces, such as the top surface of a board as shown in FIG. 1. As illustrated in FIG. 2, telescopic rod 12 is formed of telescoping segments 12a, 12b . . . 12n which may be locked in various length positions. The telescopic rod 12 has first and second ends, each of which is preferably provided with screw threaded apertures which may receive various fasteners, such as a stud carried by the ball-joint assembly 15.

Figure 4:
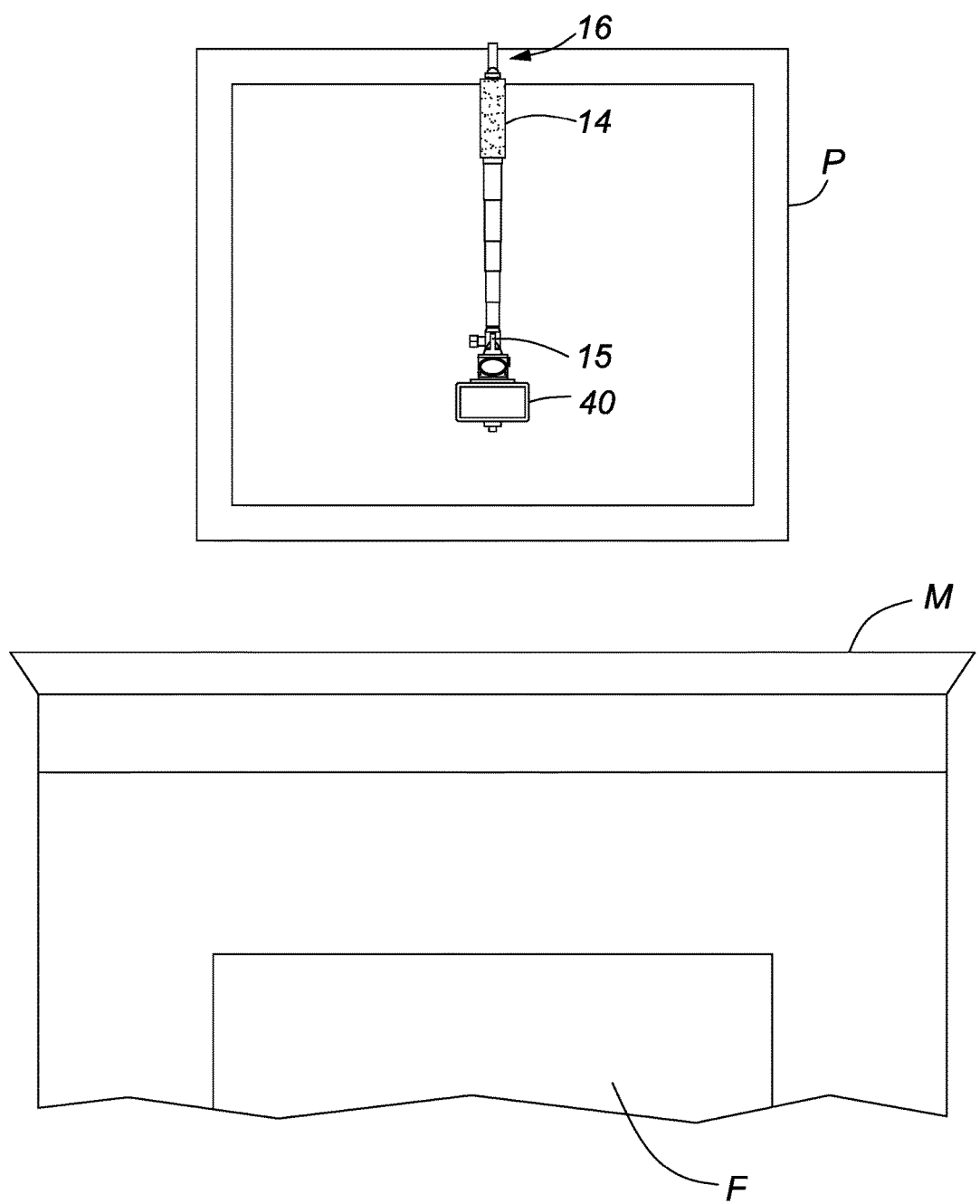
FIG. 4 is a front view showing the holding assembly in an extended position, the holding assembly being hooked to the top of picture frame and being partially extended to position the carried smartphone near eye level.

The ball-joint assembly 15 may be of differing designs, particularly one adapted to receive camera 40 as shown in FIG. 1, or alternatively smartphones as shown in FIGS. 2 and 4. Each ball-joint assembly 15 includes a first portion which is secured to an end of the rigid support as for example via a stud which is received in a threaded aperture at the end of the rigid support. The ball-joint assembly is also provided with a second portion which may be locked in various positions of adjustment via knob 22. The second portion is provided with a mirror 20 so the user can see what the camera or smartphone will capture as an image.

FIG. 2 shows the manner in which the support for a picture taking device can be mounted on a relatively flat surface. In this view, elongated lower contact surface 16e engages to top surface of a brick in a brick wall. While not shown, elongated lower contact surface 16e may engage a variety of other surfaces, such as tree bark, wall and car moldings, etc.

Figure 5:
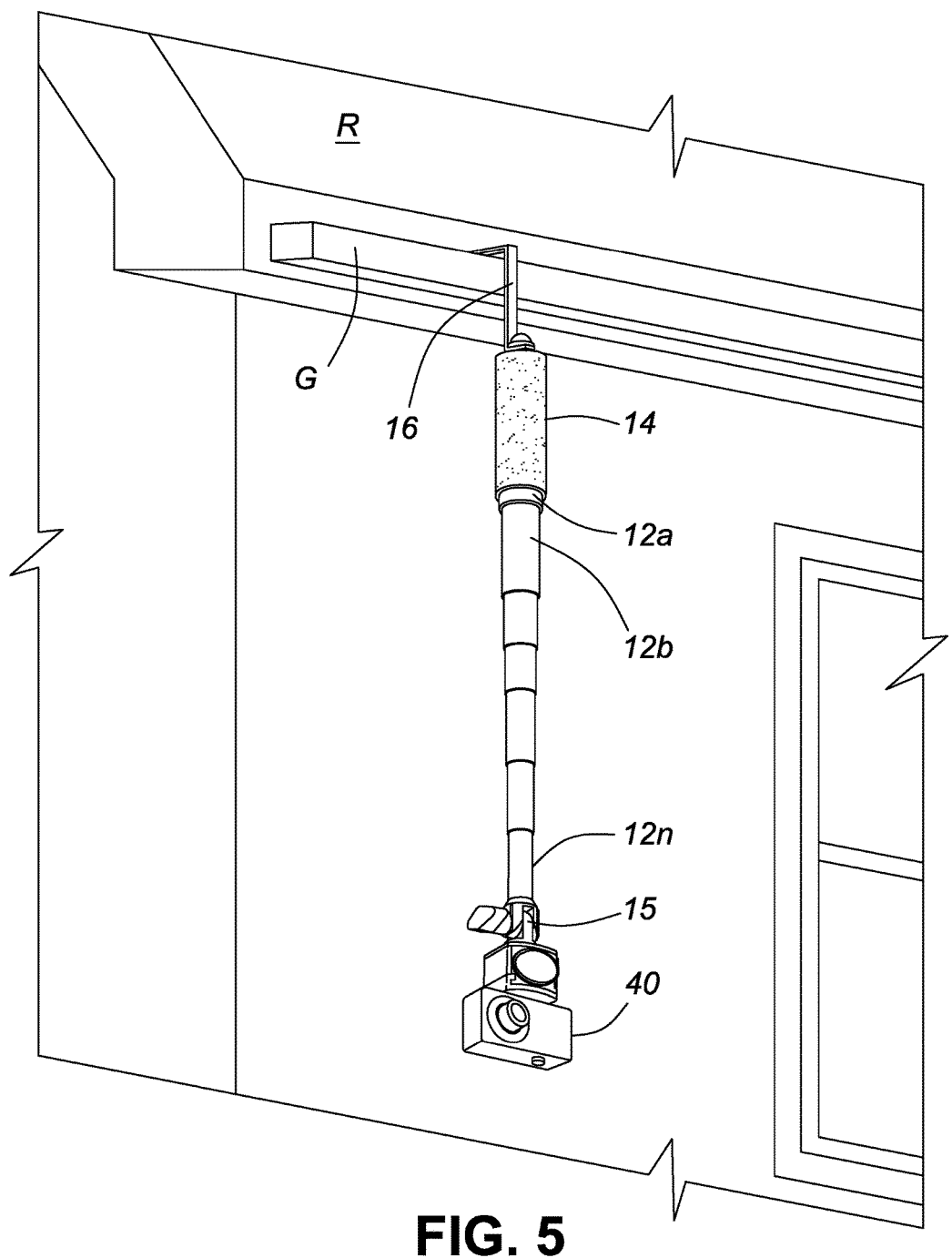
FIG. 5 is a perspective view showing the holding assembly hooked to a rain gutter and being extended to such a length that the picture taking device is at about eye level.

FIG. 4 shows the C-shaped hook 16 engaging the top of a picture frame "P" which may above a mantle "M" over a fireplace "F". In FIG. 5, C-shaped hook 16 is shown engaging a gutter "G" below a roof "R".

Figure 6:
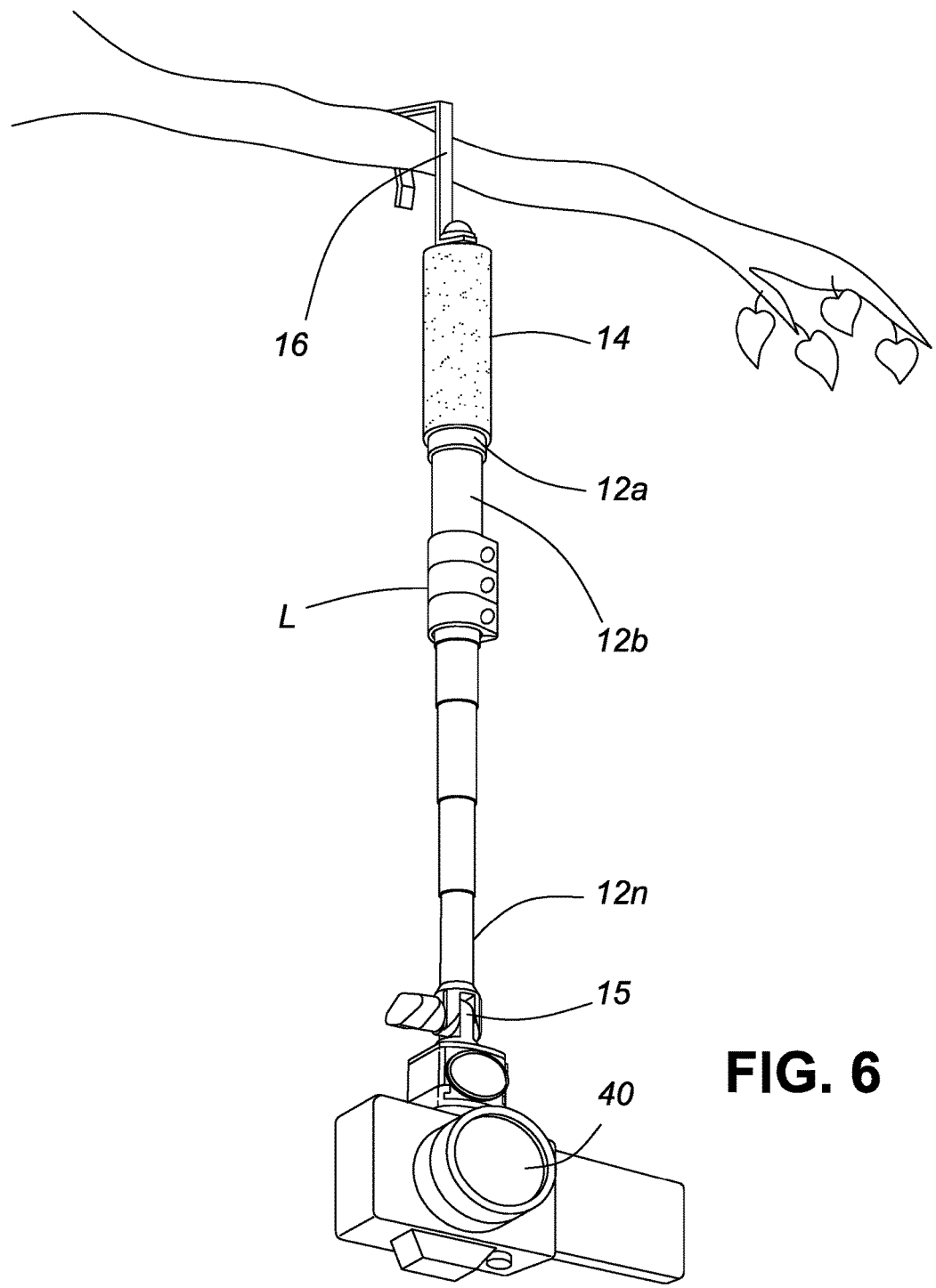
FIG. 6 is a perspective view showing the holding assembly attached to a tree branch; the holding assembly including an adjustable telescopic rod.

FIG. 6 shows a holding assembly where the telescopic rod 12 with telescopic units 12a, 12b . . . 12n has latches "L" which are used to secure the telescopic units 12a, 12b . . . 12n from sliding. This variation is desired when using a heavy picture taking device such as a DSLR.

Figure 7:
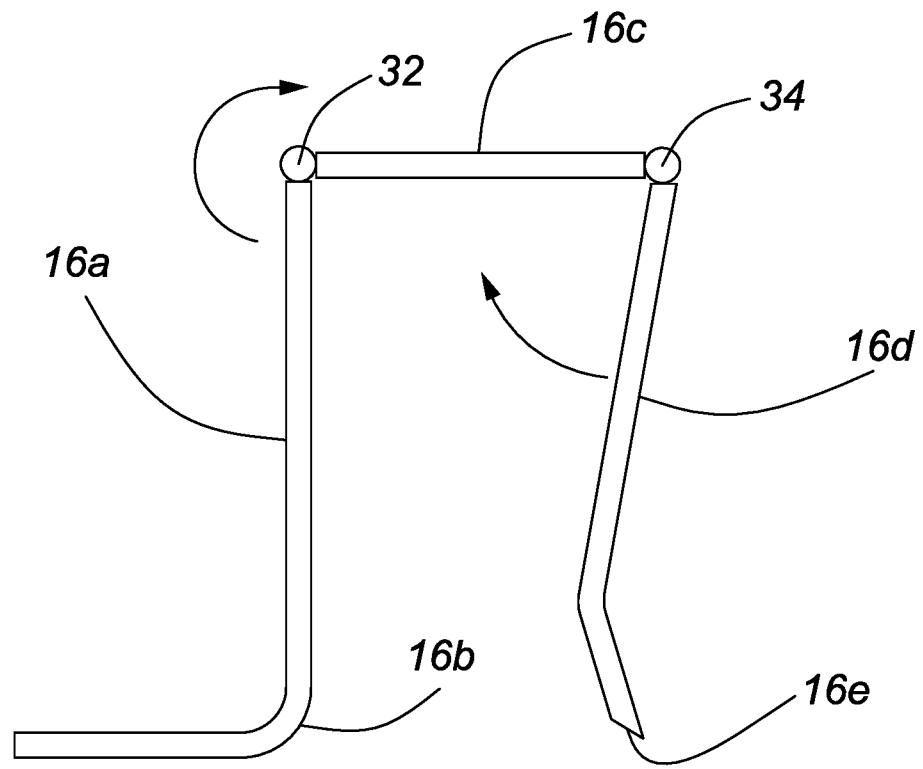
FIG. 7 is a side view showing a variation of the suspension structure where hinges are provided to permit the suspension structure to be folded.
Figure 8:
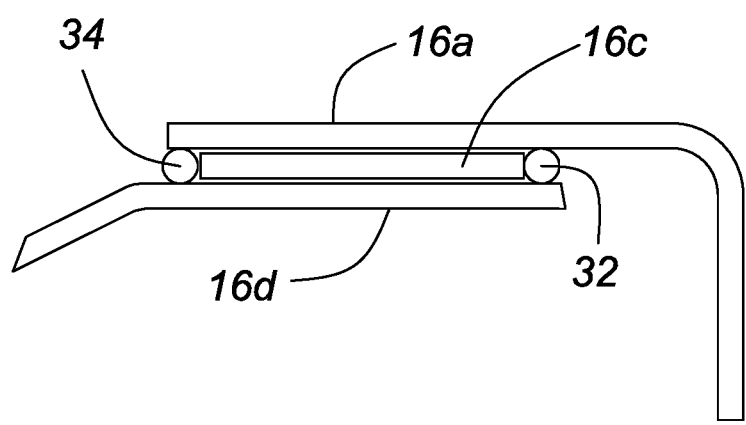
FIG. 8 is a side view showing the suspension structure in a fully folded condition.

One embodiment of C-shaped hook 16, as shown in FIGS. 7 and 8, will have hinges to allow the hook to fold for transport. Thus there will be a first hinge 32 between sections 16a and 16c, and a second hinge 34 between sections 16c and 16d. To fold the C-shaped hook 16 for transport, section 16a will initially be folded onto section 16c, and then section 16d will be folded under section 16c as shown in FIG. 8.

Figure 9:
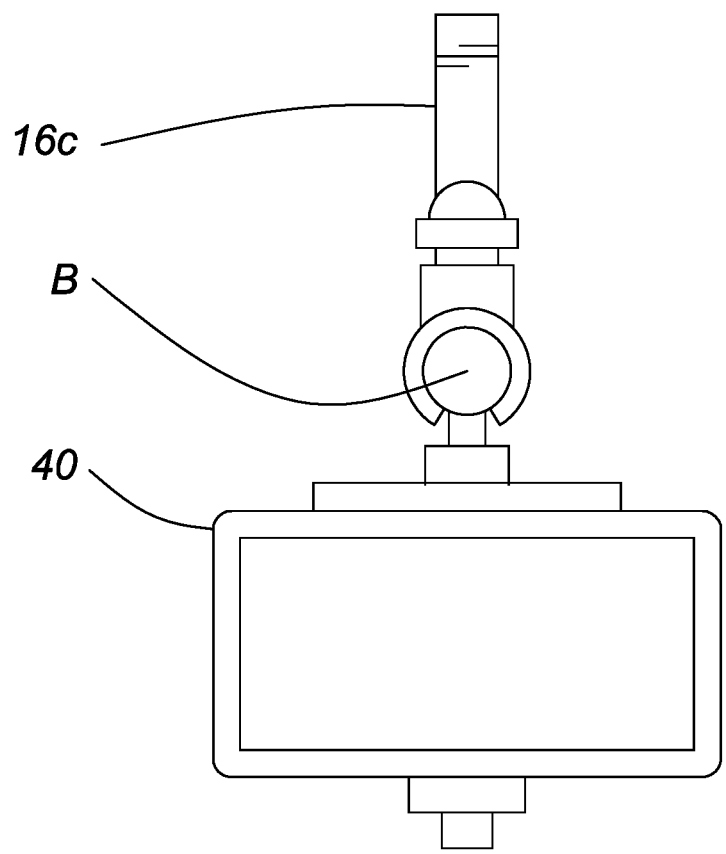
FIG. 9 is a front view showing the various parts of the holding assembly without the rigid rod-like support and the upper ball-joint assembly.

The holding assembly 10 can further be used to provide near instantaneous mounting, without damage to any surface, of a camera 40 for surveillance and/or monitoring of an area or for personal viewing of a video, such as one might do on a train, by mounting the apparatus on the back of the seat in front of the person using it. This feature is shown in FIG. 9 which, to a certain extent, corresponds to FIG. 2, except that, in FIG. 9, there is no requirement for the rigid support to have and adjustable length, nor is there a requirement for the upper ball-joint assembly 15.

Figure 10:
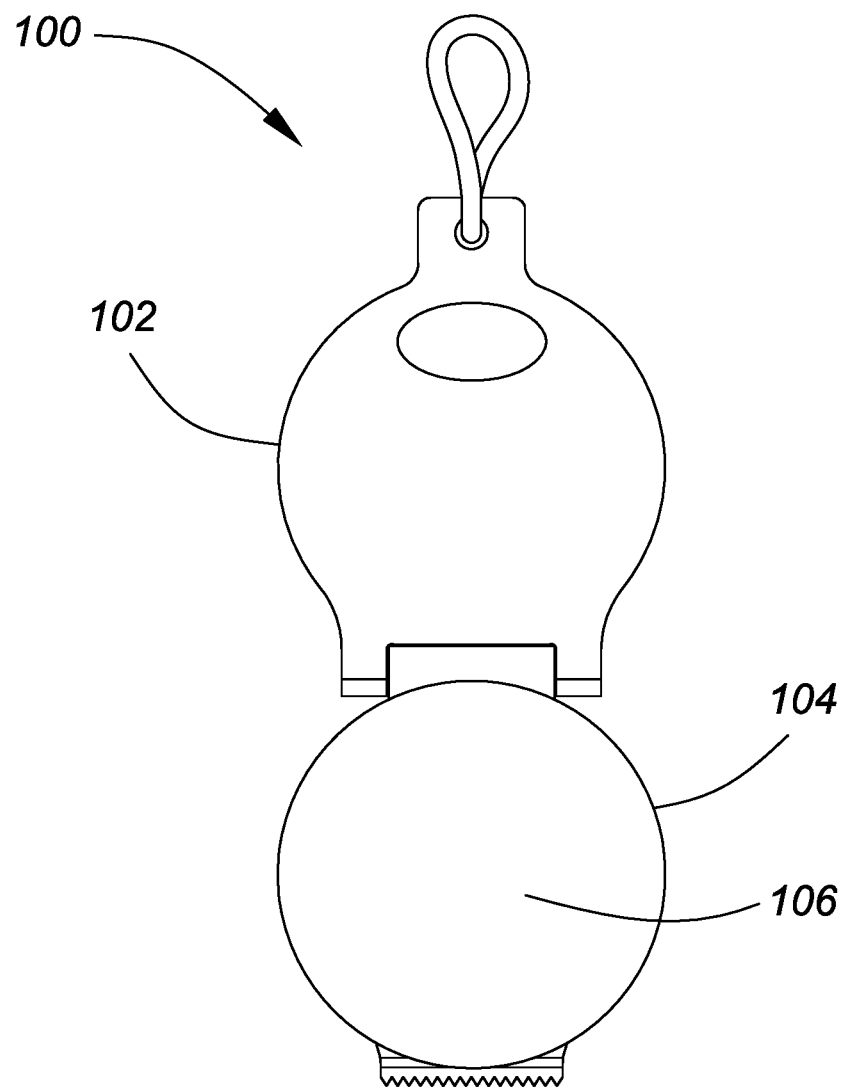
FIG. 10 is a front view of one embodiment of holding assembly having two sections that fold into an open position.

FIG. 10 shows an alternative embodiment of the present disclosure, wherein the holding assembly 100 has two sections, a camera attachment section 102 and a support attachment section 104. From the view in FIG. 10, camera attachment surface 106 is visible, whereas the support attachment surface 142 (shown in FIG. 14) is facing away from the viewer in FIG. 10. The support attachment surface 142 is on the opposite side of holding assembly 100 when in the open position, and can be seen in FIG. 14, where the two panels are separated along hinge 140. The hinge 140 may allow the two sections to rotate away from each other beyond 180 degrees to allow for attachment to a wide variety of surfaces, while having the camera remain vertically positioned.

Figure 11:
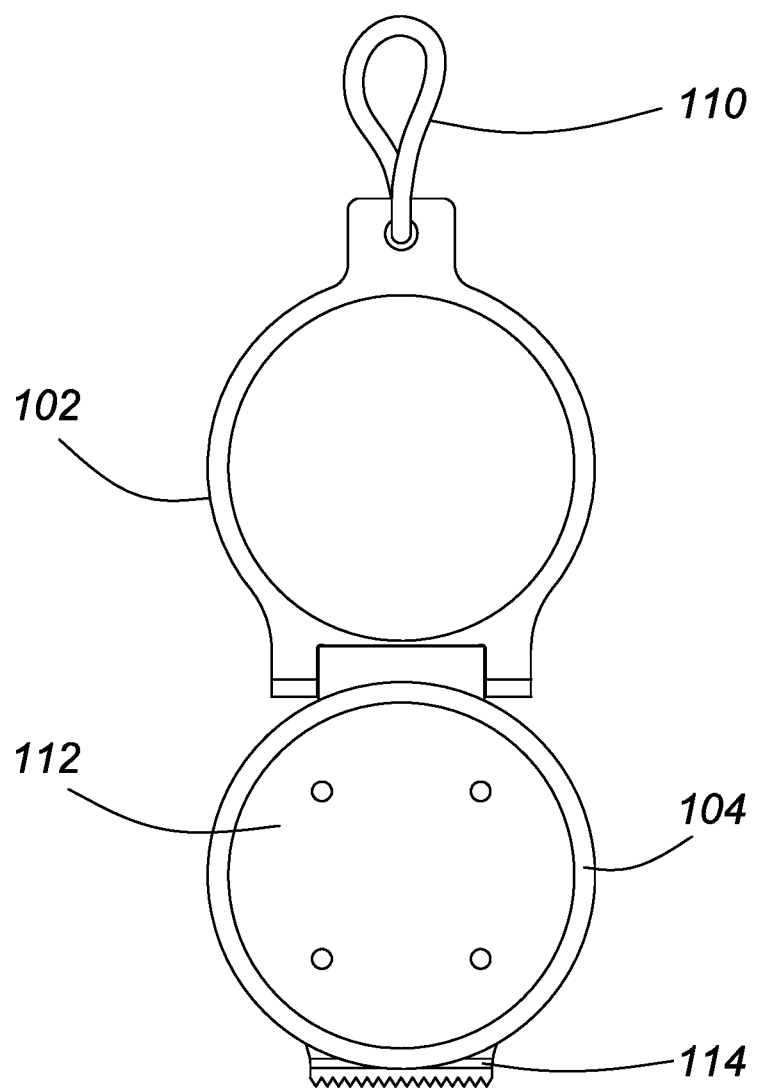
FIG. 11 is a cross sectional front view of the holding assembly in an open position.

FIG. 11 shows a post for screw holes 112 and rigid serrated grip 114. Rigid serrated grip 114 provides a significant advantage, in terms of holding power and stability, when combined with the adhesive means of attachment on the support attachment surface 142. Rigid serrated grip 114, in the preferred embodiment, extends below the camera attachment section 104 and curves toward a support on the support side of camera attachment section 104, extending beyond the vertical plane of the support side of camera attachment section 104 and gripping the support with teeth 116, shown in FIG. 12, at its lower end.

The teeth 116 of rigid serrated grip 114 contact the support and may form an angle of approximately 90 degrees with the support, as illustrated in FIG. 20b, although this angle may vary in some embodiments. The angle formed between the teeth 116 and the region of the support directly above the teeth 116 will generally be between approximately 10 and 90 degrees, such that the teeth 116 may grip the support to provide additional holding power to holding assembly 100.

Figure 12:
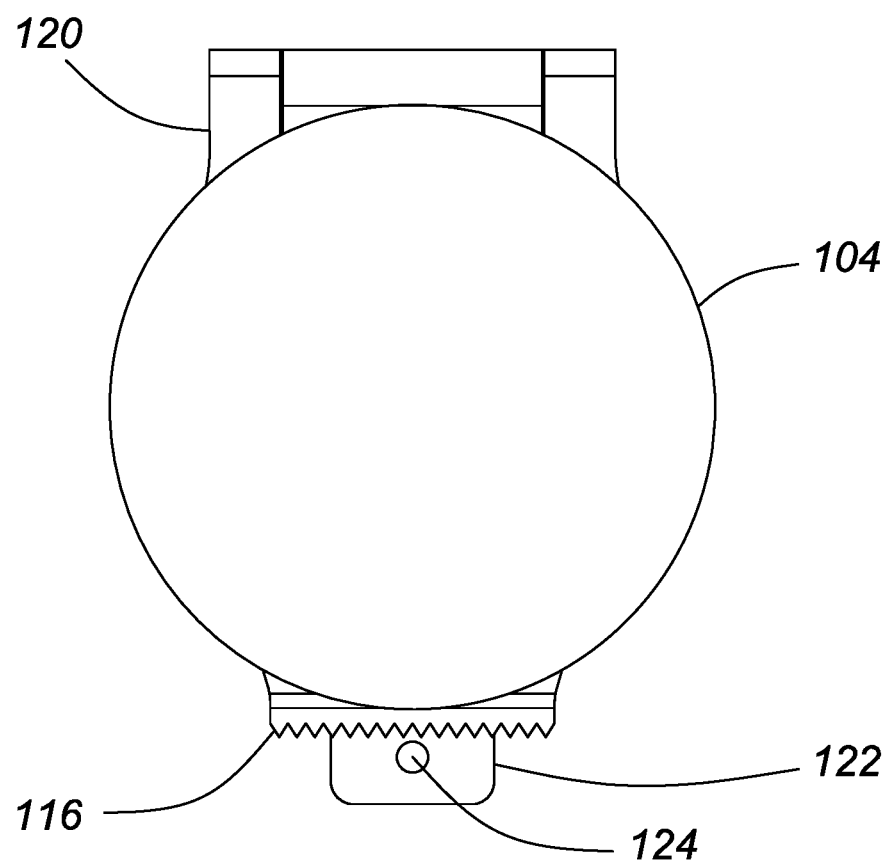
FIG. 12 is front view of the holding assembly in a closed position.

FIG. 12 shows a front view of holding assembly 100 when in the closed position. A tab 122 is included having an aperture 124 to accept additional means attaching holding assembly 100 to a support, such as tether 110. Teeth 116 are shown attached to the lower portion of camera attachment section 104 for gripping a support.

Figure 13:
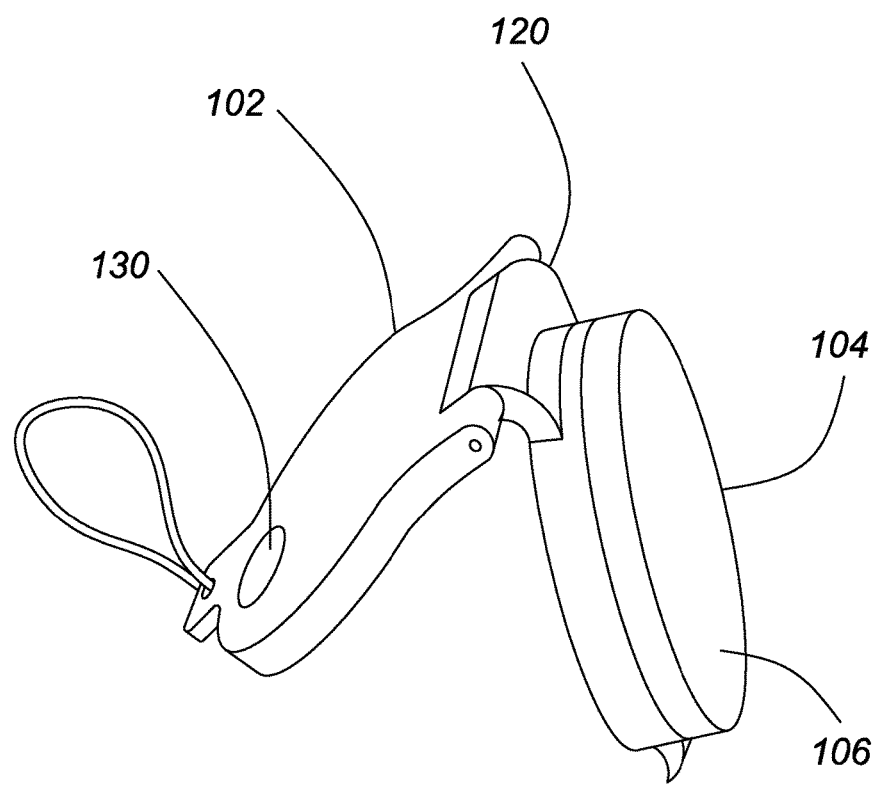
FIG. 13 is a perspective side view of the holding assembly in a partially-open position.
Figure 14:
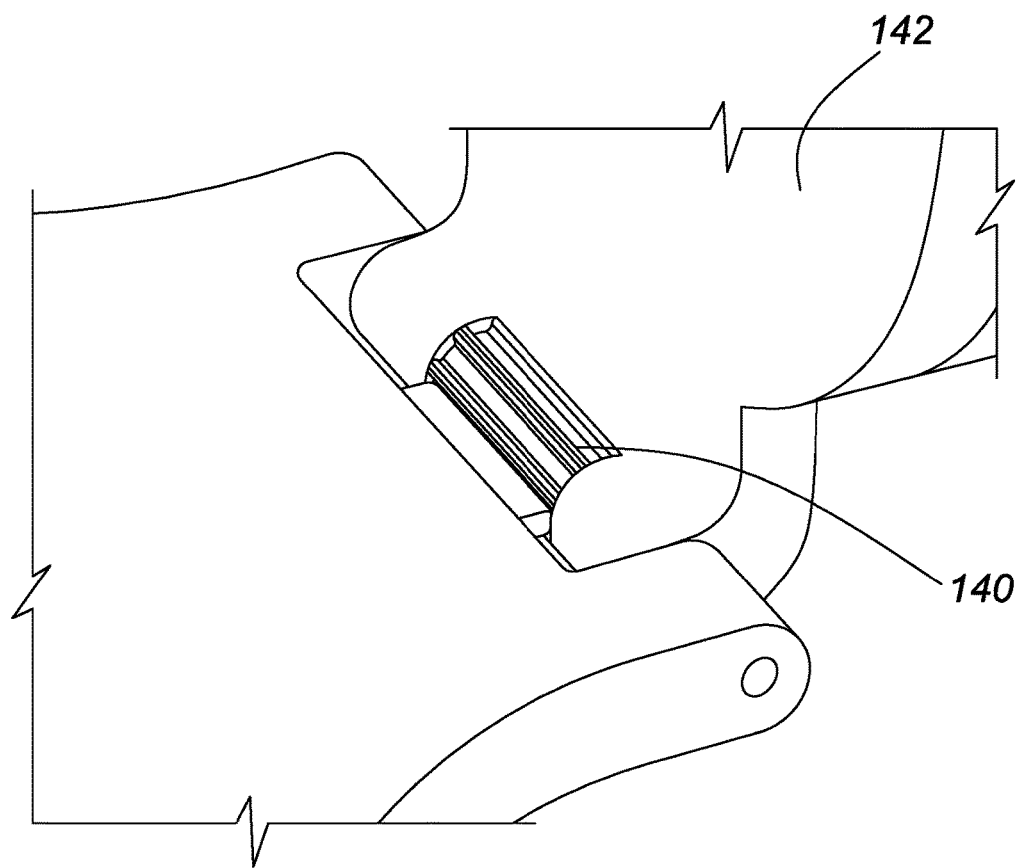
FIG. 14 is a magnified perspective view of the hinge of the holding assembly.

FIG. 13 shows a convex mirror 130. The mirror 130 may be of various shapes and sizes. FIG. 14 shows a hinge 140 having a hinge rod, which in alternative embodiments may be a ball-joint type hinge, for opening the holding assembly 100. Support attachment surface 142 is shown. The support attachment surface 142 may be an adhesive in the preferred embodiment. The adhesive is preferably washable and will not leave a significant residue on the support or camera. The adhesive may be GK-22, produced by Northstar Polymers.

Figure 15:
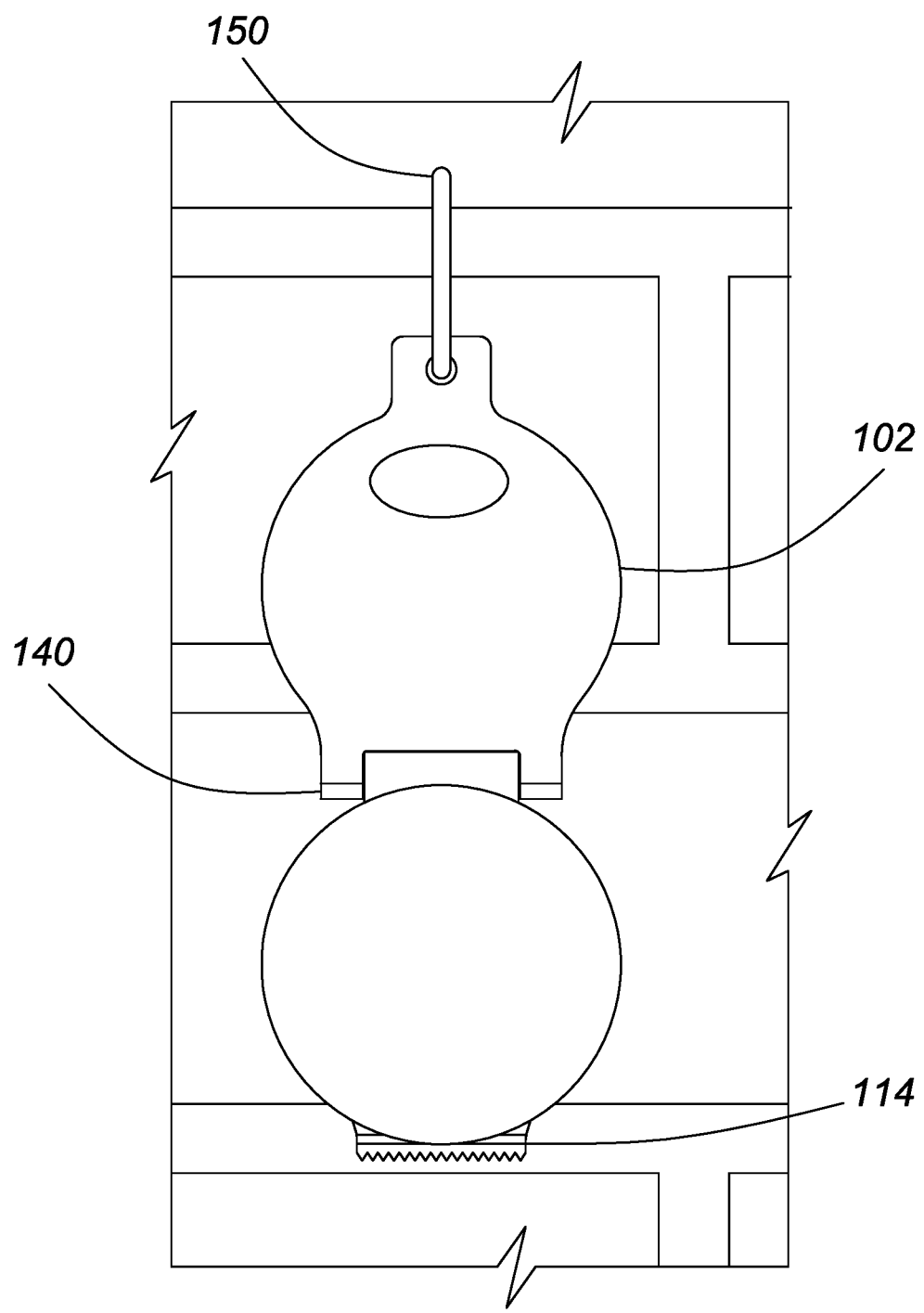
FIG. 15 is a front view of the holding assembly with a hook.
Figure 16:
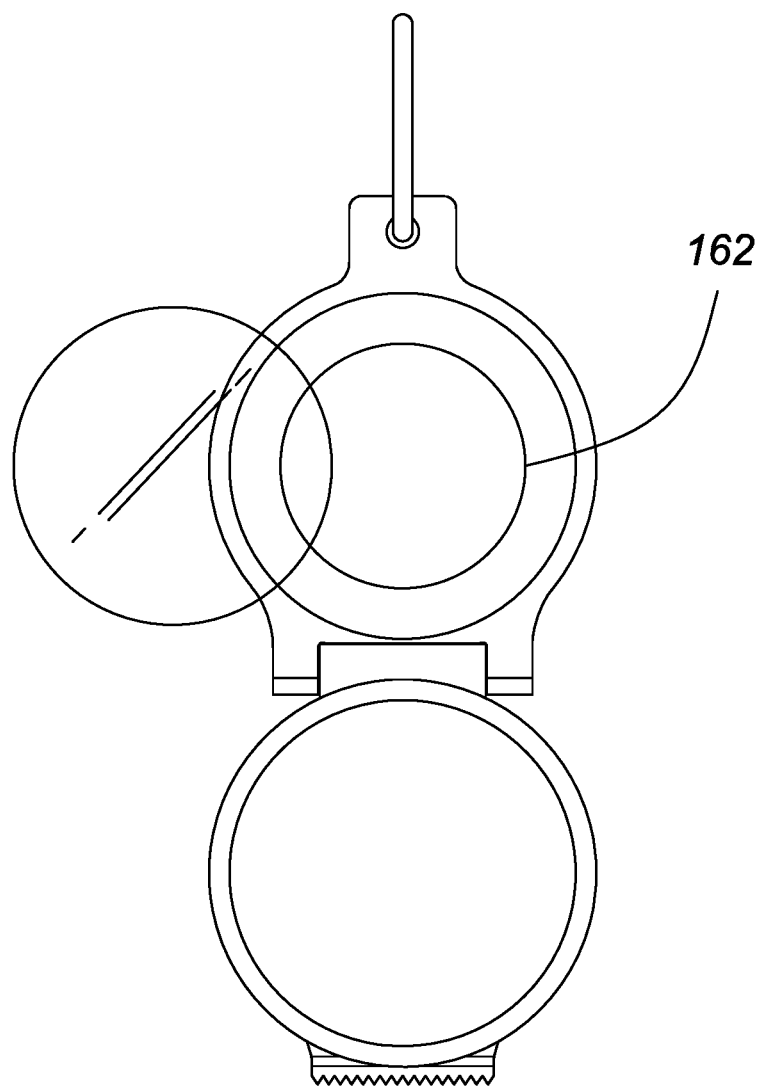
FIG. 16 is a front view of a partially assembled holding assembly.
Figure 17:
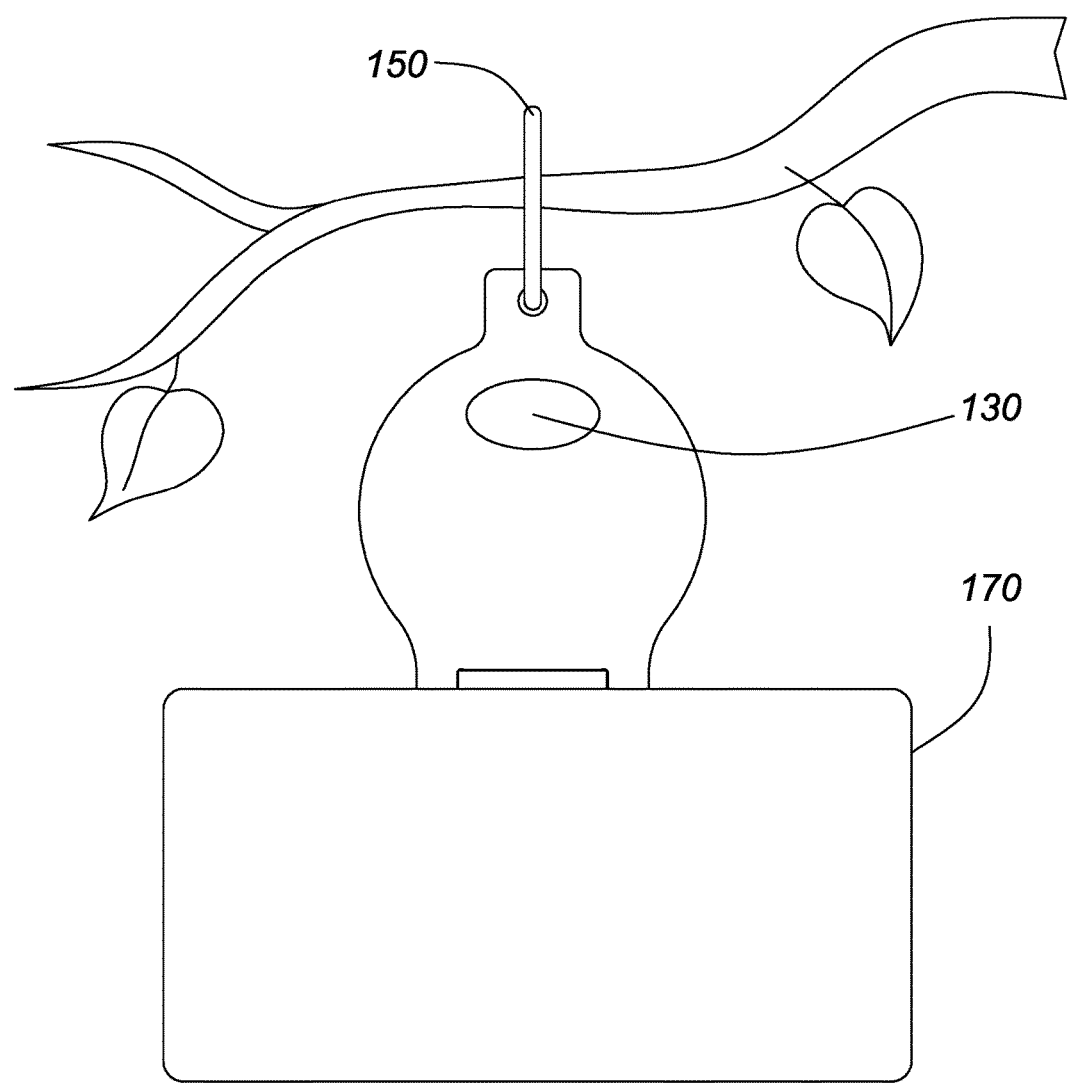
FIG. 17 is a front view of the holding assembly with a camera horizontally attached.
Figure 18:
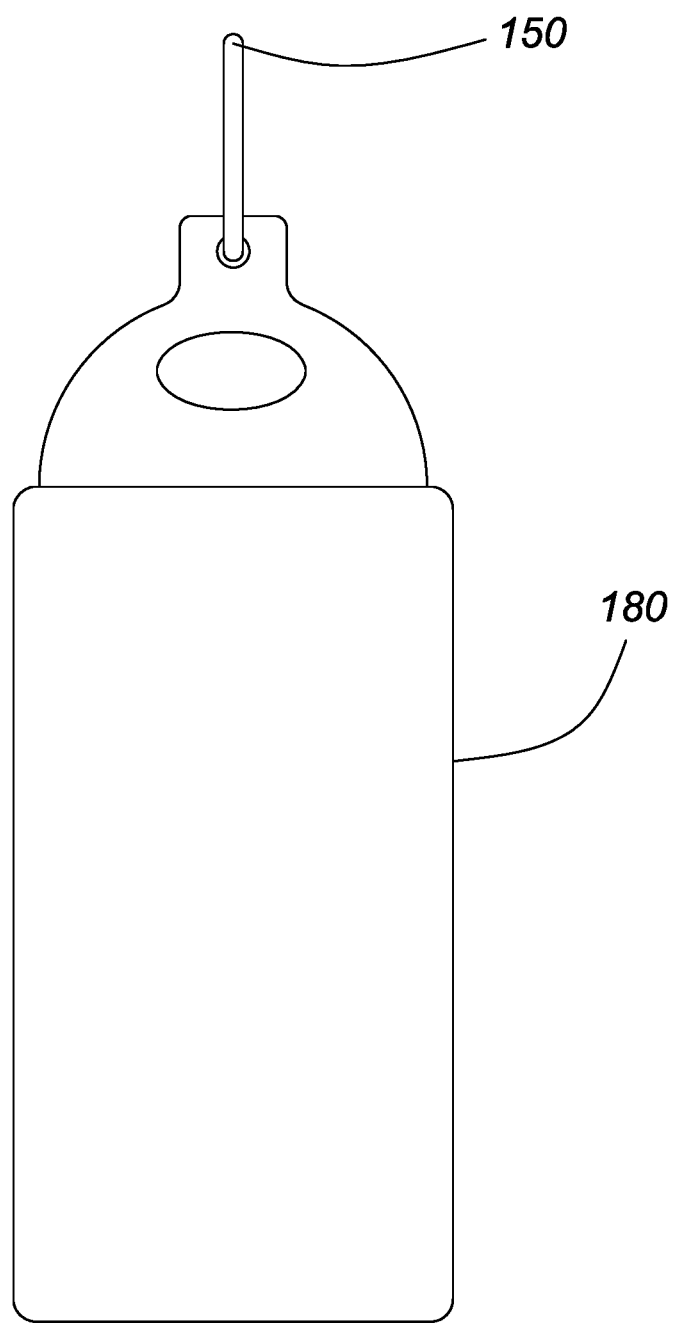
FIG. 18 is a front view of the holding assembly with a camera vertically attached.
Figure 19:
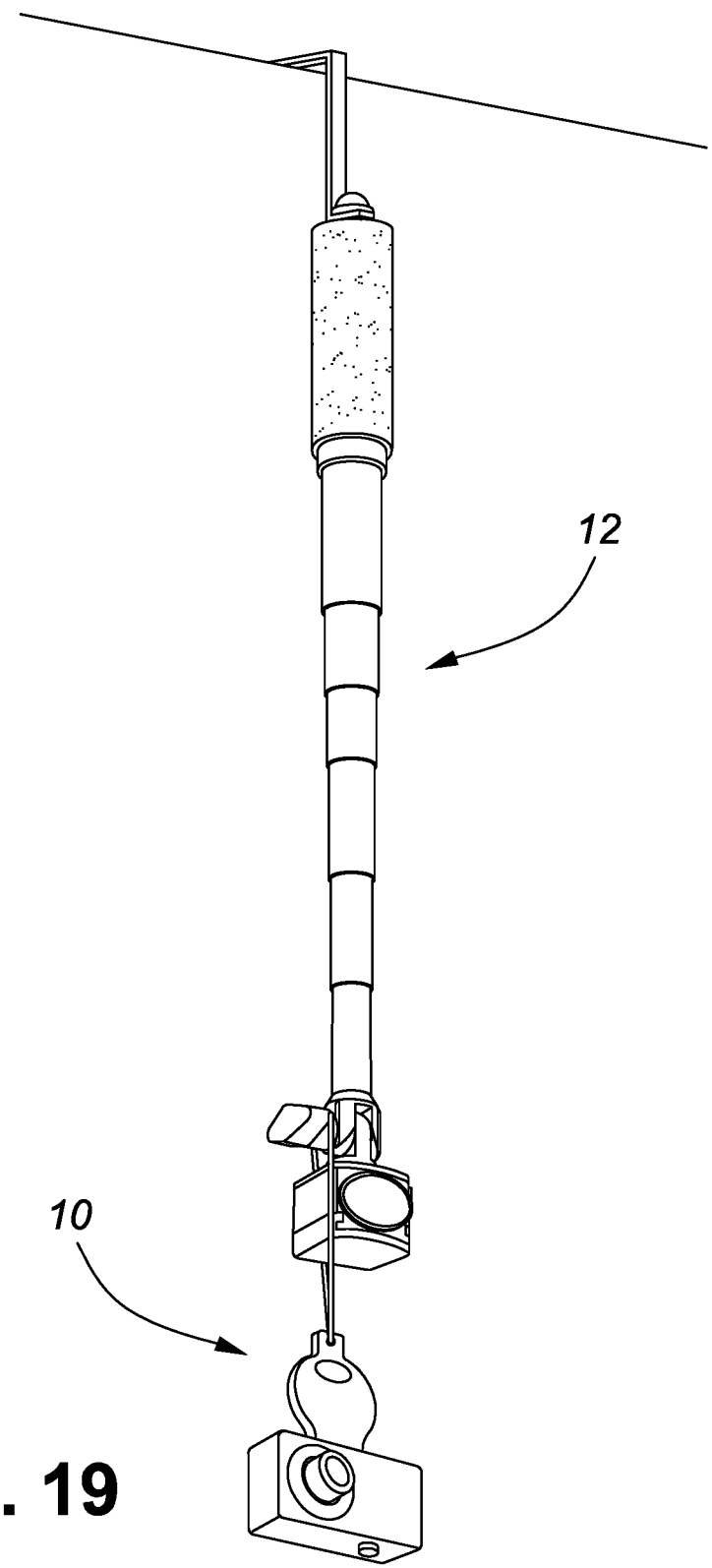
FIG. 19 is a perspective view of the holding assembly with a telescopic rod attached to the panels by a tether.

FIG. 15 illustrates a J-hook 150 connected to holding assembly 100 through aperture 124. FIG. 16 shows cover plate 162. FIG. 17 shows convex mirror 130 and the J-hook 150 supporting holding assembly 100 through attachment to a tree branch. Horizontal camera 170, which may be a smartphone, is attached to the camera attachment surface 106. FIG. 18 shows vertical camera 180 and J-hook 150. FIG. 19 shows a holding assembly 110 combined with telescopic rod 12 attached to a flat support.

Figure 21:
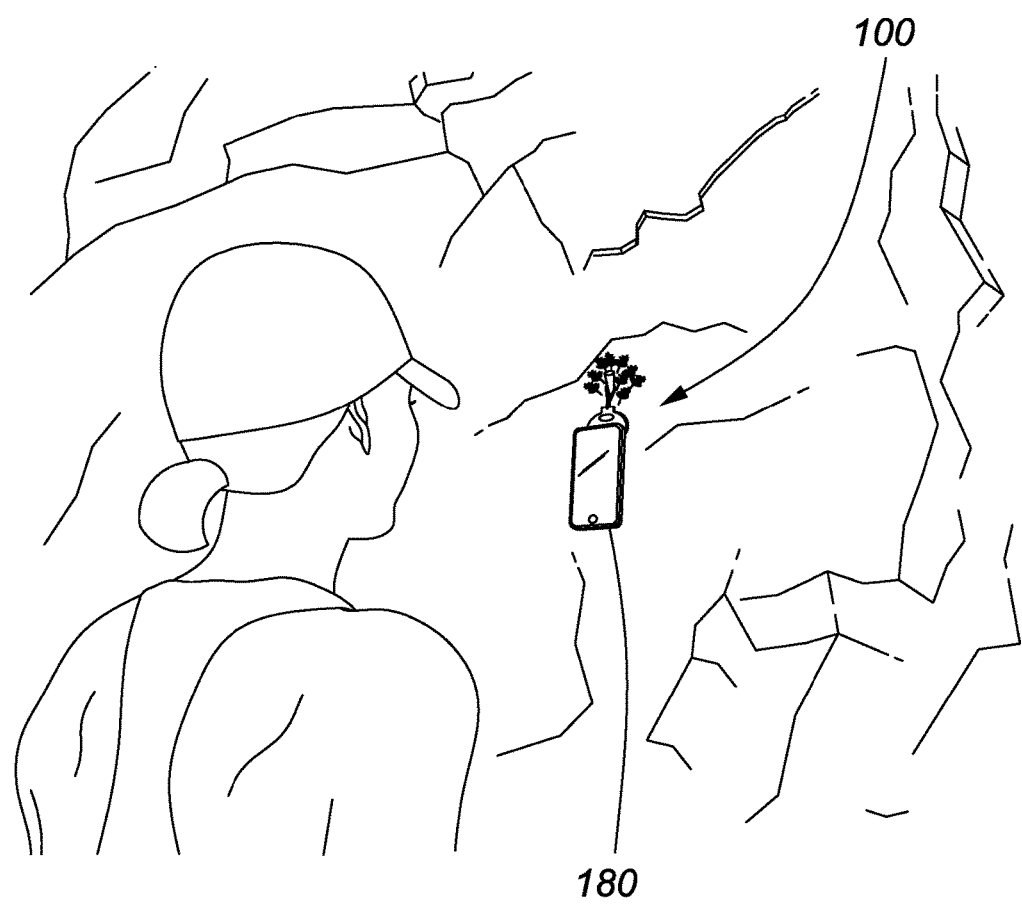
FIG. 21 shows a perspective view of the holding assembly attached to an uneven support surface.

FIG. 20a shows an embodiment of the present disclosure having a plurality of magnets 200 in the camera attachment section 104. The magnets 200 allow attachment of a camera 40, which may be a smartphone, to the camera attachment surface 106 without the use of adhesives or other means of attachment. Alternatively adhesives and other means of attachment may be used in combination with magnets 200. FIG. 20b illustrates a side cross-sectional view of holding assembly 100 showing magnets 200 along with cover plate 204. FIG. 20b provides a side view of rigid serrated grip 114, which adds stability to holding assembly 10 when in use. Additionally, tab 122 can be seen in FIG. 20b. FIG. 21 shows holding assembly 100 attached to an uneven surface, such as a mountainside, for support. Vertical camera 180 is attached to the holding assembly 100.

Figure 22:
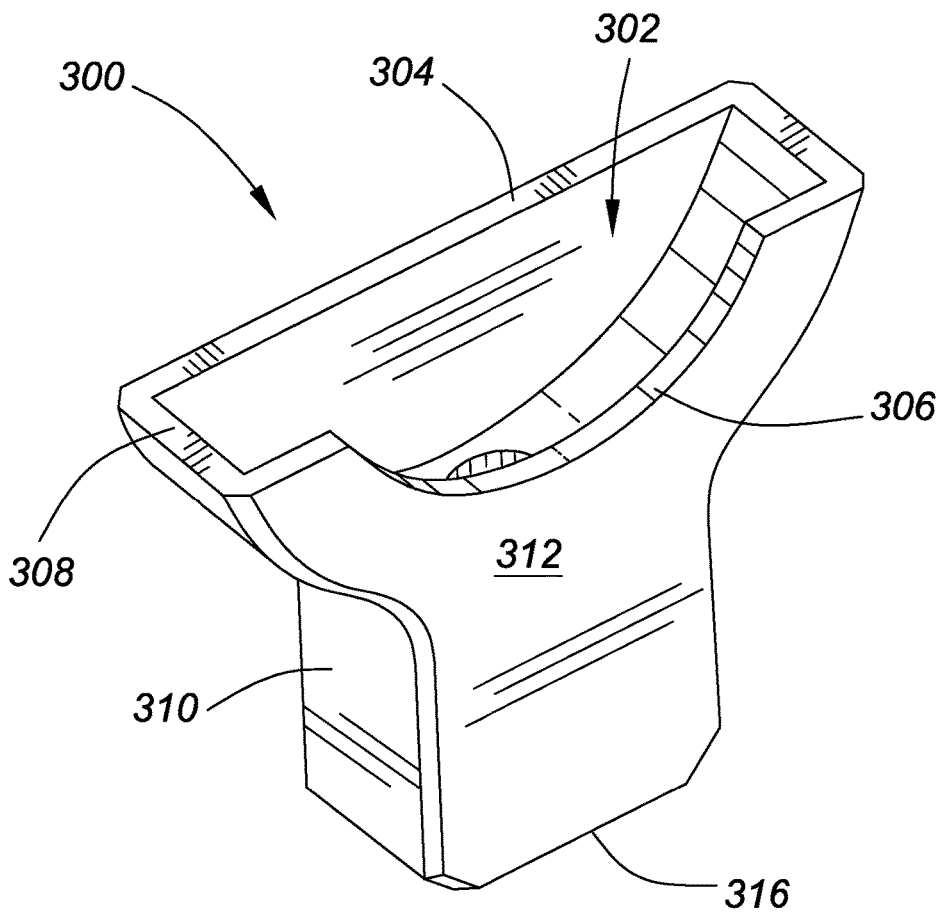
FIG. 22 shows a perspective view of the tripod connecting adapter.

FIG. 22 is a perspective view showing a tripod connecting adapter 300 according to the present invention. The tripod connecting adapter 300 has a front panel 312, which includes a front support 306 having a curved top edge. The peaks on the circumference of the curved top edge occur at the outer portion of the front support 306, where the topmost portions of top edges of the front support 306 form a level surface with the top edge of side support 308 and the top edge of rear support 304. The side supports 308, included in side panels 310, form a horizontal, generally 90 degree angle with the front support and comprises a generally semi-circular curve that matches the shape of the outer edges of front support 306.

Together, front support 306, side supports 308 and rear support 304 form camera holding assembly pocket 302. In one embodiment, the lower portion of the pocket 302 may be shaped to match the shape of the support attachment section 104 of the camera holding assembly which is to be mounted in the pocket 302. In this embodiment, the camera attachment surface 102 folds down over the front support 306 of the tripod connecting adapter after the support attachment section 104 is placed into the pocket 302.

Figure 24:
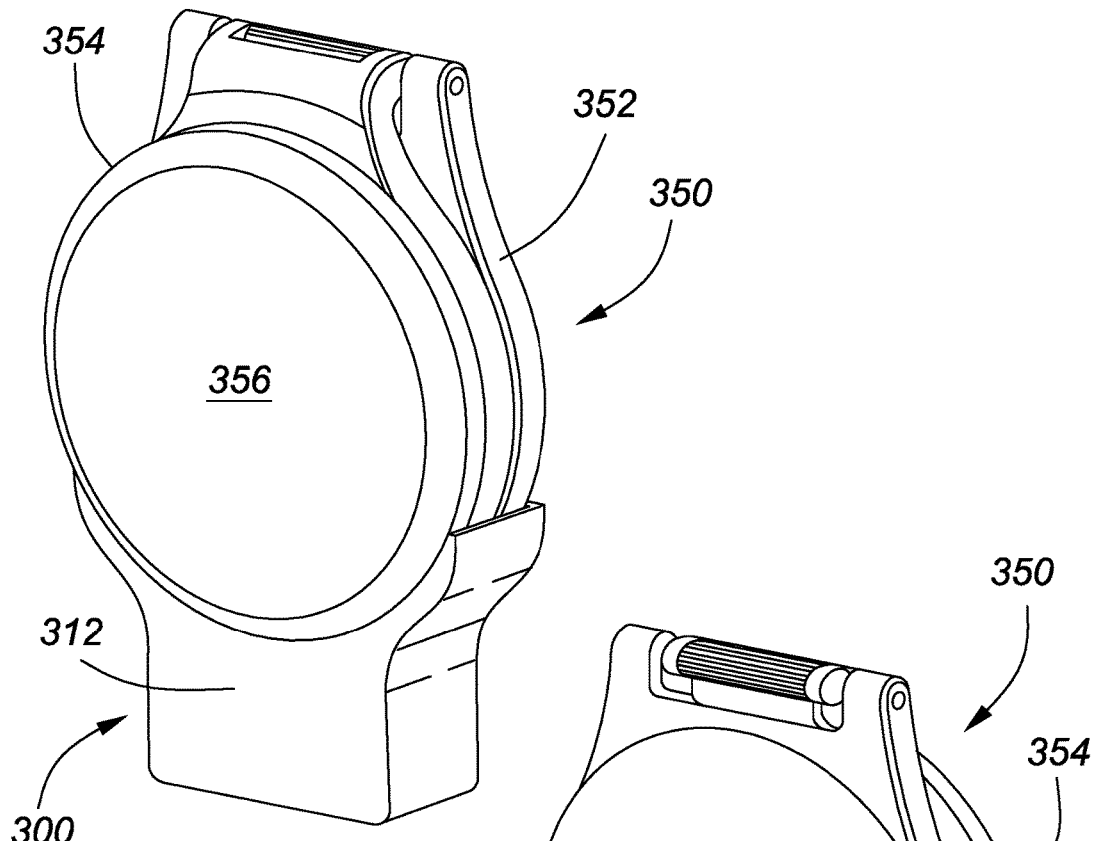
FIG. 24 shows a front perspective view of the tripod connecting adapter attached to a camera holding assembly.

With regard to matching the shape, for example, for a curved camera holding assembly 350 shown in FIG. 24, the lower portion of the pocket 302 that the camera holding assembly 350 is curved in a semi-circle to match its shape. In other embodiments, the pocket of the camera holding assembly may be rectangular, or matched to fit any shape camera holding assembly.

Figure 23:
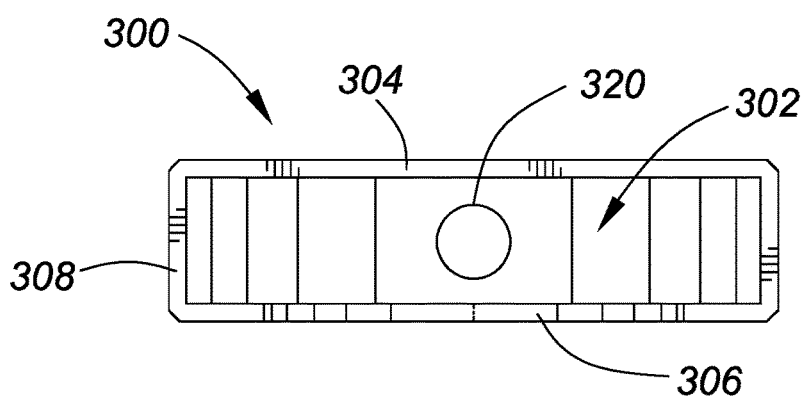
FIG. 23 shows a top view of the tripod connecting adapter.

FIG. 23 shows a top view of tripod connecting adapter 300 looking down into camera holding assembly pocket 302. Camera holding assembly pocket 302 includes bolt hole 320, which may be mounted on all standard tripod bolts, or any device or armature that features a ¼" bolt or equivalent.

Figure 25:
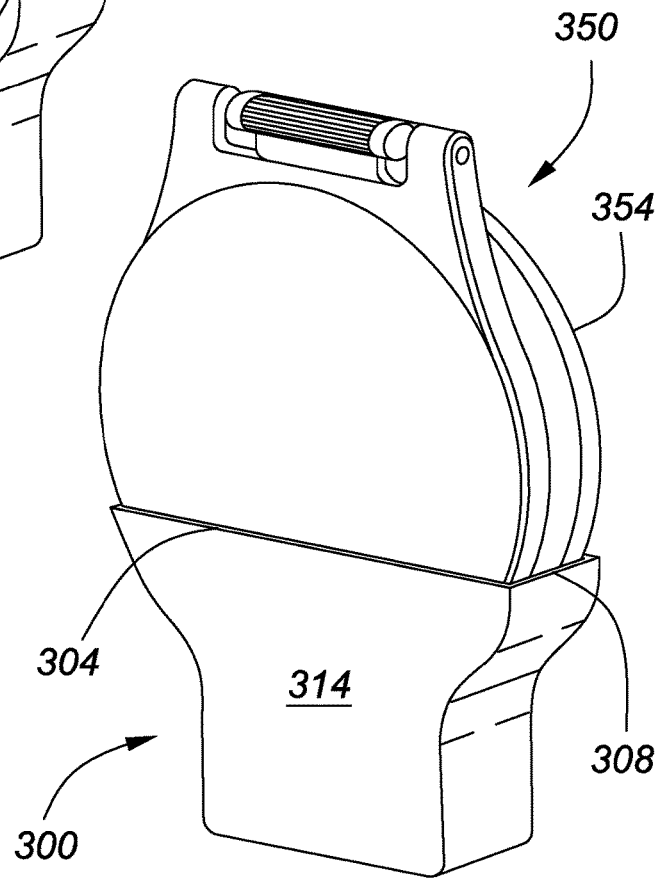
FIG. 25 shows a rear perspective view of the tripod connecting adapter attached to a camera holding assembly.
Figure 26:
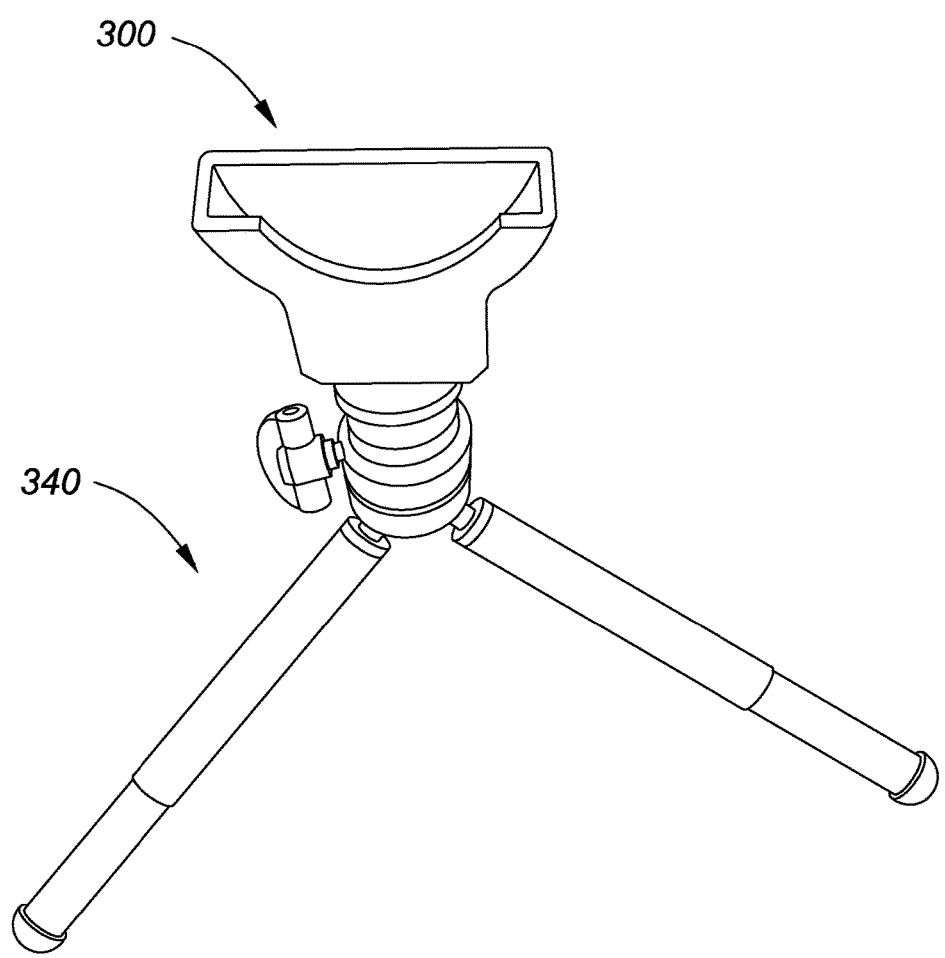
FIG. 26 shows a front perspective view of the tripod connecting adapter attached to a tripod.

FIGS. 24 and 25 show tripod associated camera holding assembly 350 mounted in tripod connecting adapter 300. In one embodiment, the camera attachment surface 356 may be a suction cup comprised of a flexible material, as would be known in the art, for holding a camera. The suction cup may have a shape and dimensions similar to the shape and dimensions of attachment surface 356. As shown in FIG. 25, rear panel 314 has a rear support 304 with an top edge level with the top of the tripod connecting adapter 300, extending between side supports 308. Rear support 304 provides stability on one side of tripod connecting adapter 300, whereas front support 306 provides additional stability while also allowing a dual gap associated camera 550 (shown in FIG. 35 full access to camera attachment surface 356. FIG. 26 is a perspective view showing a tripod 340 attached to tripod connecting adapter 300.

Figure 27:
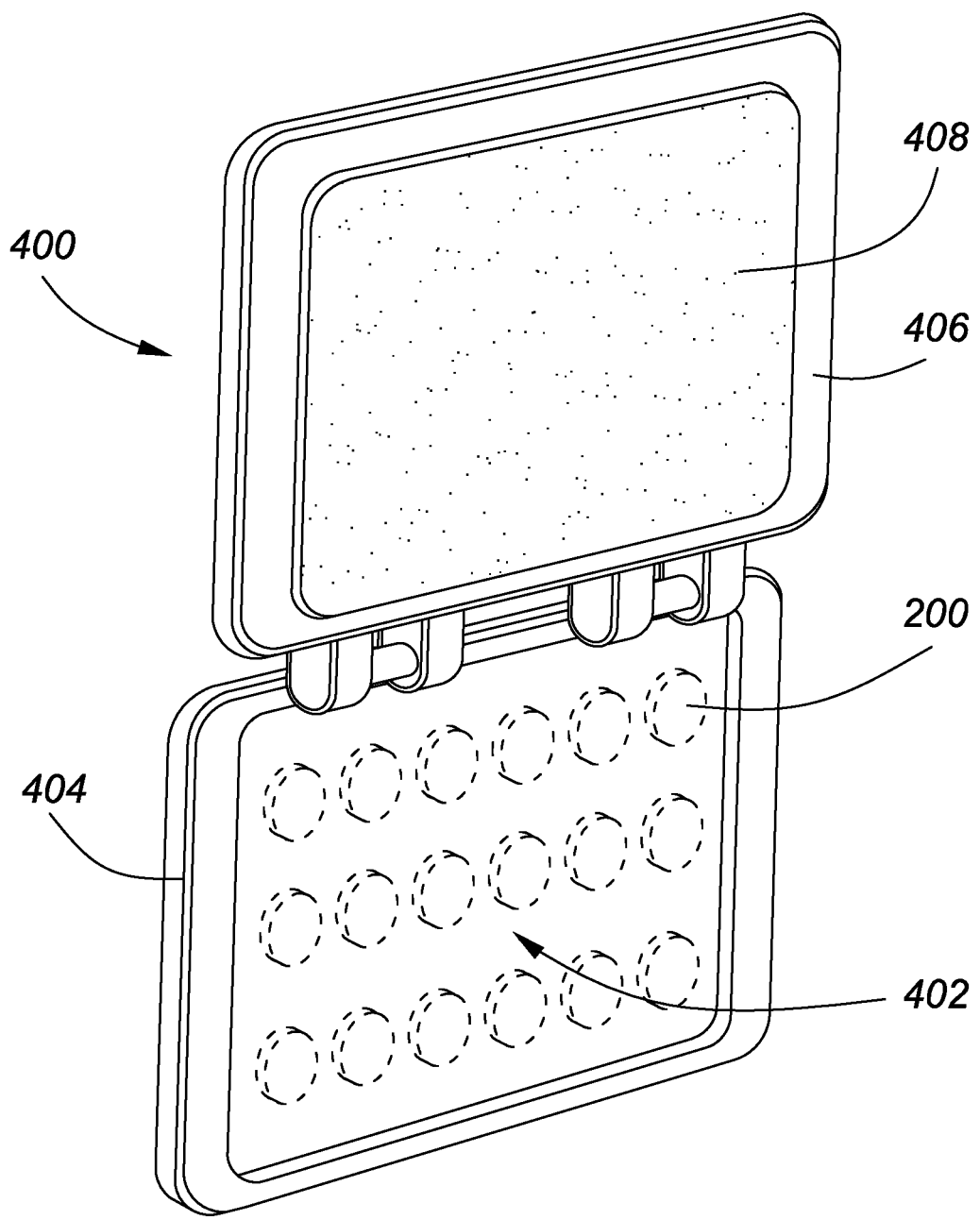
FIG. 27 shows a rear perspective cutaway view of the tool attachment section of the tool attachment assembly showing the array of magnets embedded in the tool attachment section.

FIG. 27 shows a rear perspective view of an alternative embodiment of the present disclosure where, instead of a holding a camera, the magnets 200 embedded in tool holding assembly 400 are used to hold metal devices such as metal tools. The features of tool holding assembly 400 are similar to that of a tripod associated camera holding assembly 350, however, the shape of tool attachment section 404 of tool holding assembly 400 is generally rectangular and contains an array of magnets 402, which is generally similar in shape to tool attachment section 404.

FIG. 27 shows a rear perspective view of the tool attachment section 404 of the tool holding assembly 400 showing an array of magnets 402 embedded inside tool attachment section 404. Magnets 200 may be comprised of rare earth metals for a stronger hold or weaker magnetic substances, depending on user need. Magnets 200 are preferably generally circular in shape and are embedded in tool attachment section 404. Above tool attachment section 404, as shown in FIG. 27, is tool associated tool associated support attachment section 406. Support attachment section 406, in the preferred embodiment of the present disclosure, has a tool associated adhesive portion 408 for attaching tool associated support attachment section 406 to a support such as a wall.

Figure 28:
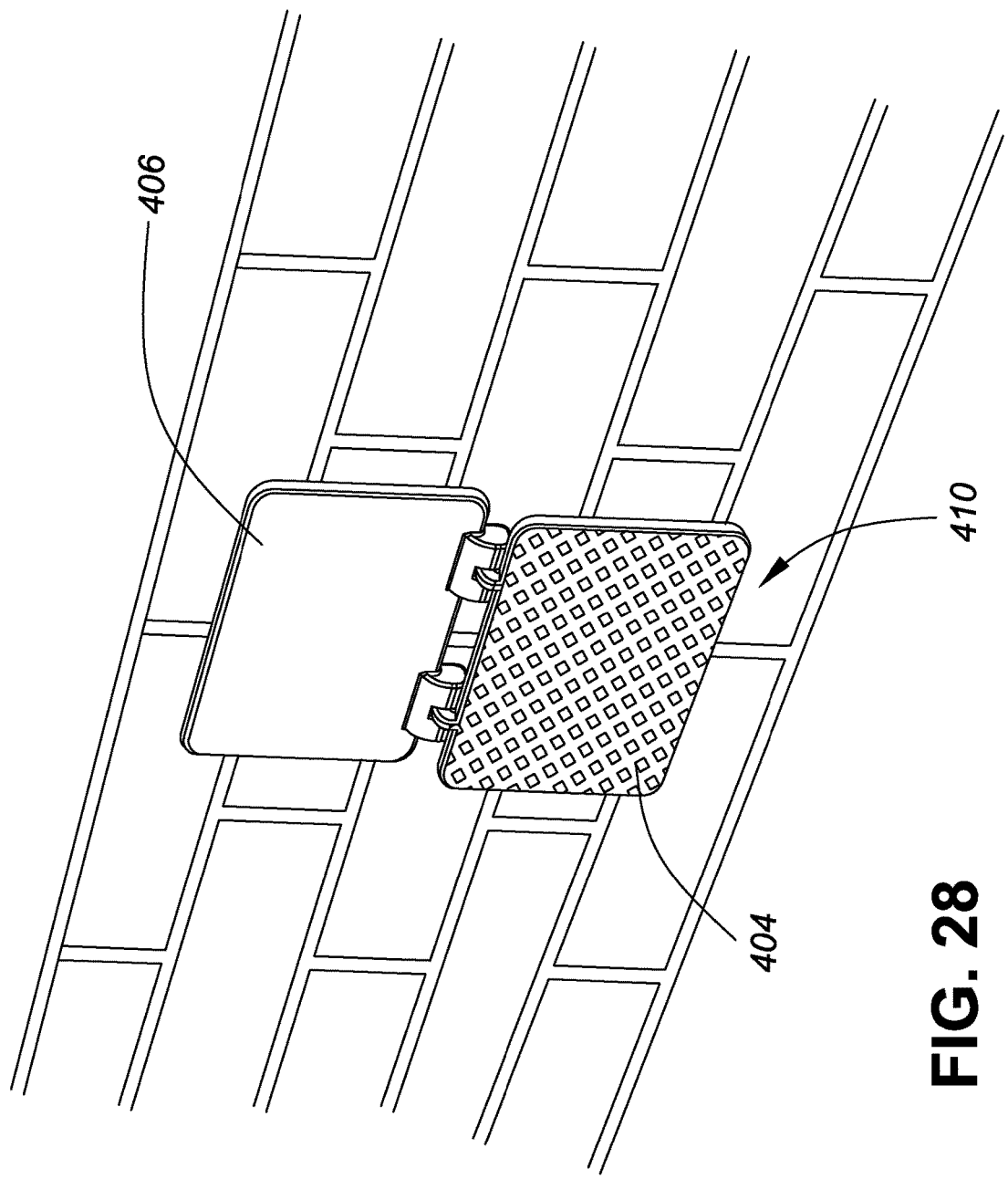
FIG. 28 shows a front perspective view of the tool attachment assembly attached to a wall illustrating the tool attachment surface.

Shown in FIG. 28 is tool holding assembly 400 attached to a brick wall with tool associated tool associated adhesive portion 408. A corrugated tool attachment surface 410 is illustrated, in the preferred embodiment, where the surface is comprised of corrugated rubber, however, other surfaces and materials, such as a flat surface and vinyl material, are contemplated within the present disclosure.

Figure 29:
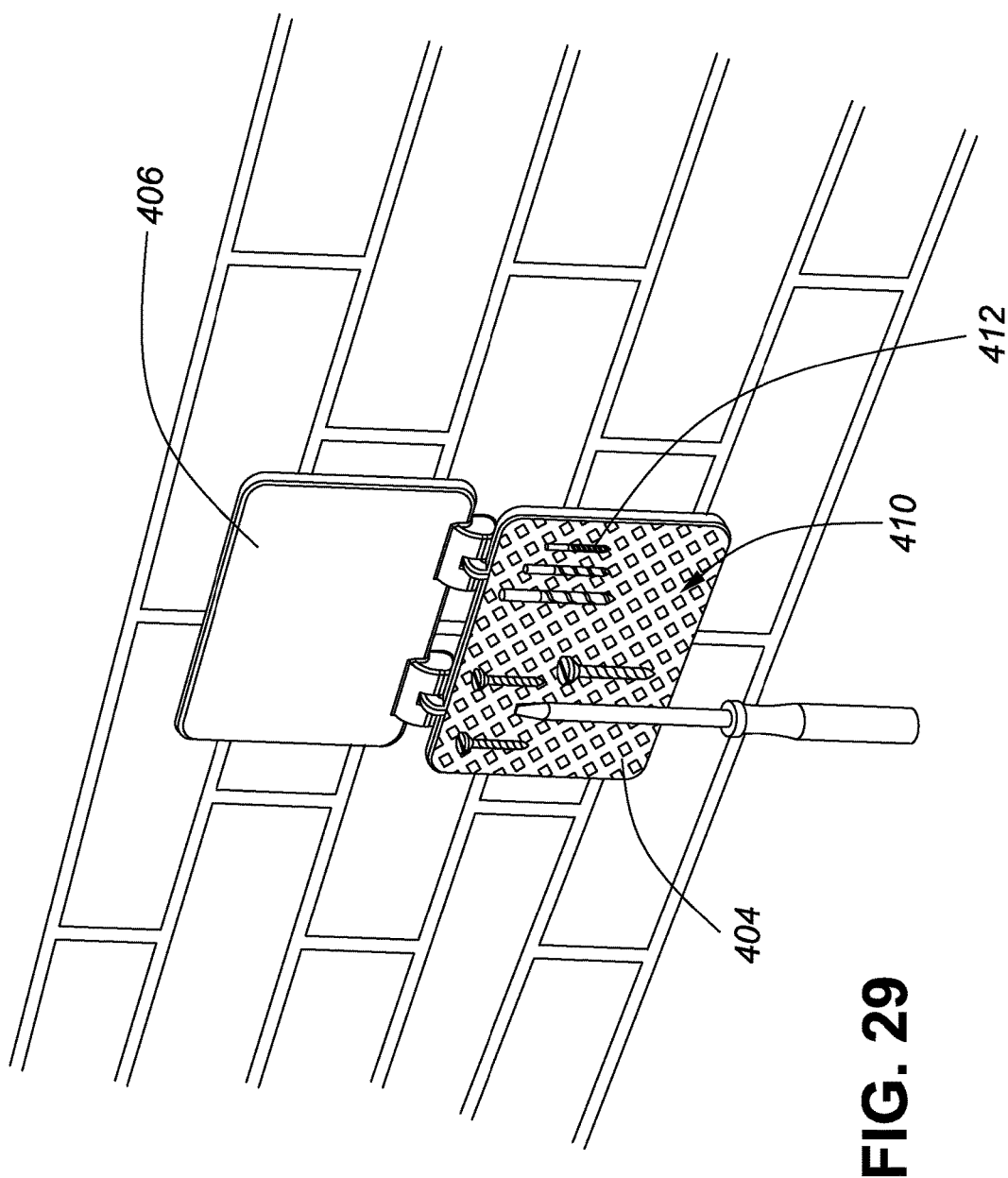
FIG. 29 shows a front perspective view of the tool attachment assembly attached to a wall showing the tool attachment surface with tools attached.
Figure 30:
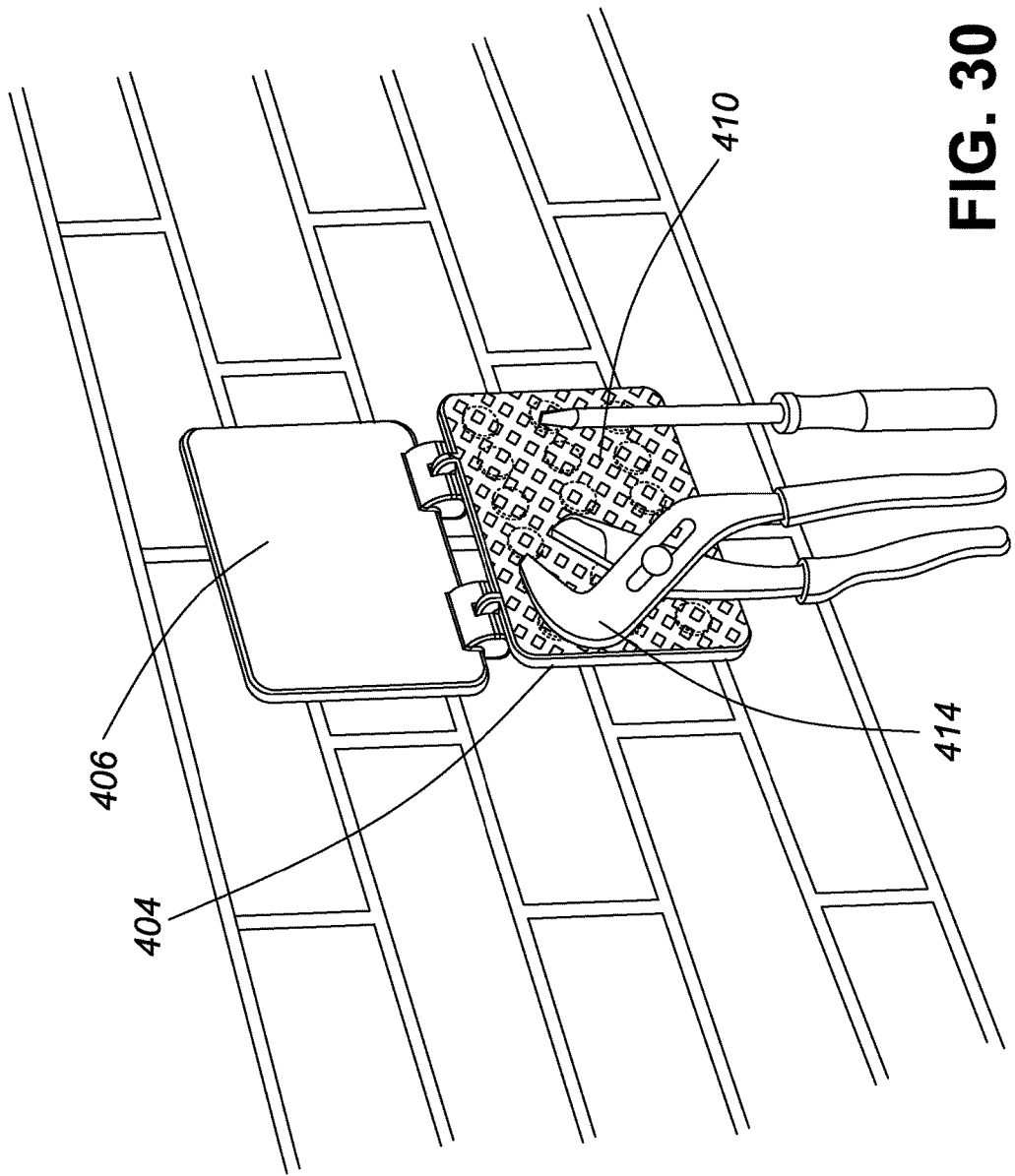
FIG. 30 shows a front perspective view of the tool attachment assembly attached to a wall showing the tool attachment surface with tools attached and magnets outlined.

FIGS. 29 and 30 show tool holding assembly 400 attached to a wall with representative tools attached. Different types of magnets 200 may be used for different needs. For example, lower weight items like drill bits 412 may only require less expensive standard material magnets, whereas a wrench 414, shown in FIG. 30, may require a stronger, rare earth magnet. FIG. 30 illustrates an outline of the magnets 200 beneath tool attachment surface 410. In some embodiments, the outline of magnets 200 may be visible on tool attachment surface 410, while in other embodiments magnets 200 may not be visible.

Figure 31:
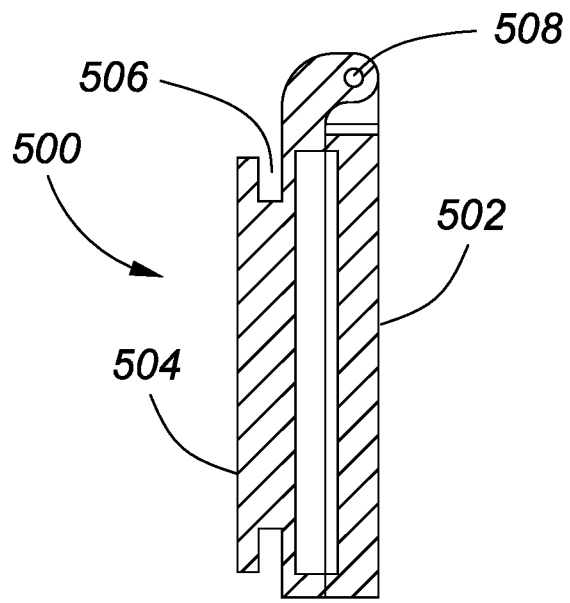
FIG. 31 shows a cross sectional side view of a camera holding assembly configured to adapt to a flexible camera adapter.

FIG. 31 shows a cross sectional side view of flexible multi gap adapter connecting camera holding assembly 500 having a multi gap associated support attachment section 502 and camera attachment section 504, which fold together at multi gap associated hinge 508. A central gap attachment groove 506 along the outer circumference of multi gap associated camera attachment section 504 accepts flexible multi gap adapter 520 (shown in FIG. 32).

Figure 32:
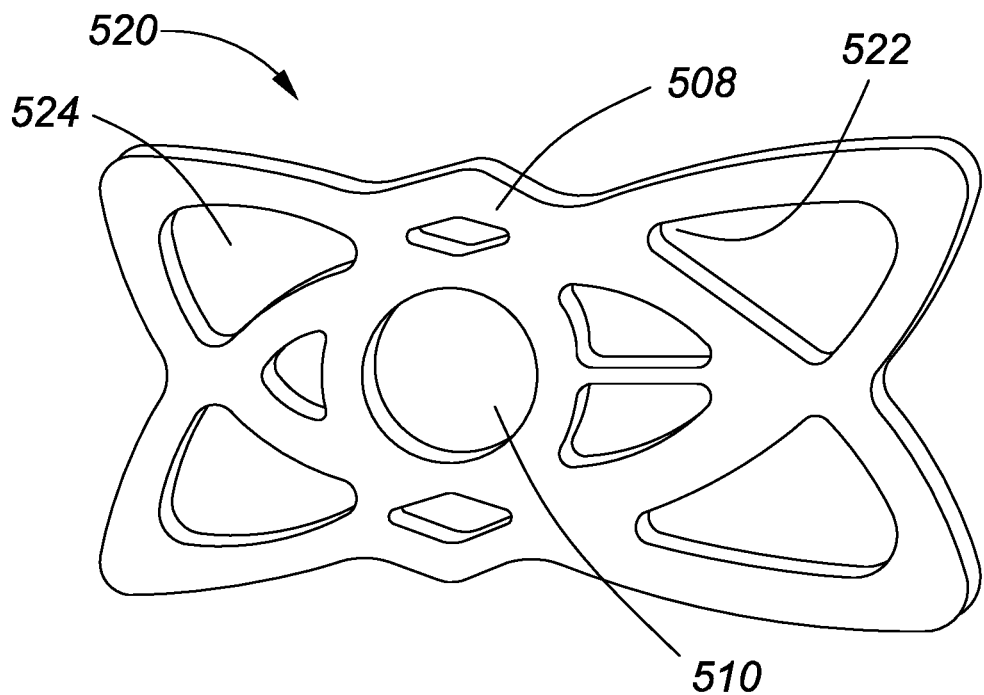
FIG. 32 shows a front perspective view of a flexible multi gap camera adapter.

With regard to FIG. 32, which shows a commercially available and known flexible multi gap adapter 520, a front perspective view of the flexible multi gap adapter 520 is shown. Flexible multi gap adapter 520 has an elasticity that allows for multi gap adapter camera holding assembly acceptor hole 510 to stretch to accept flexible adapter camera holding assembly 500 of the present disclosure. Adjacent the corners of flexible multi gap adapter 520 are camera acceptor gaps 524, which stretch to accept a camera.

Figure 33:
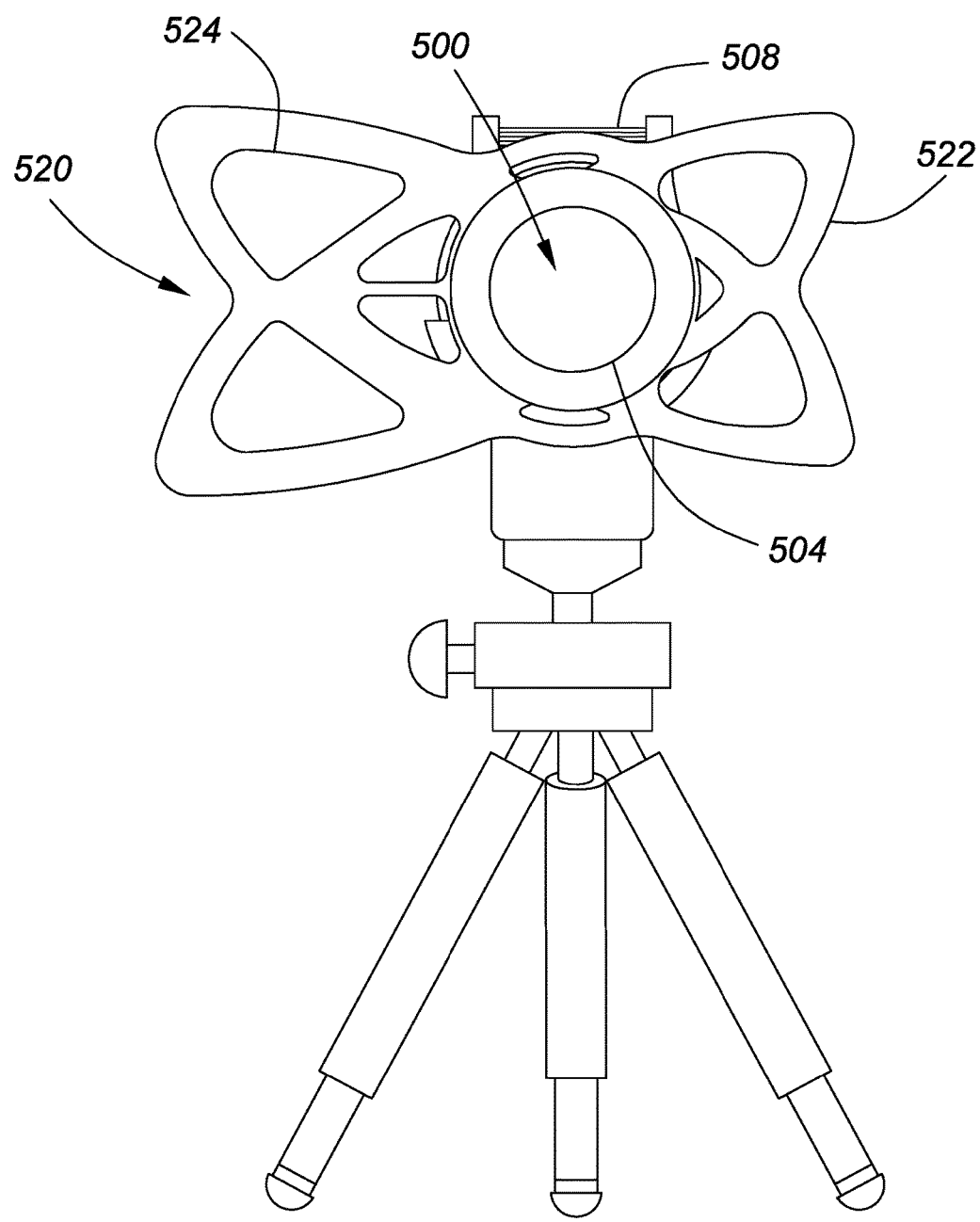
FIG. 33 shows a front perspective view of a camera holding assembly attached to a multi gap flexible camera adapter on a tripod.

With regard to FIG. 33, a front view of flexible adapter connecting camera holding assembly 500 is shown with flexible multi gap adapter 520 attached. Flexible multi gap adapter 520 is preferably comprised of silicone which has an elasticity allowing for insertion of the larger circumference of the central circular portion which is identified in FIG. 33 as camera attachment section 504. FIG. 33 shows one embodiment of the system of the present disclosure, where a tripod connecting adapter 300 is shown mounted on tripod 340 along with flexible adapter camera holding assembly 500 inserted in the pocket of tripod connecting adapter 300. Attached to flexible camera holding assembly 500 is flexible multi gap adapter 520.

Figure 34:
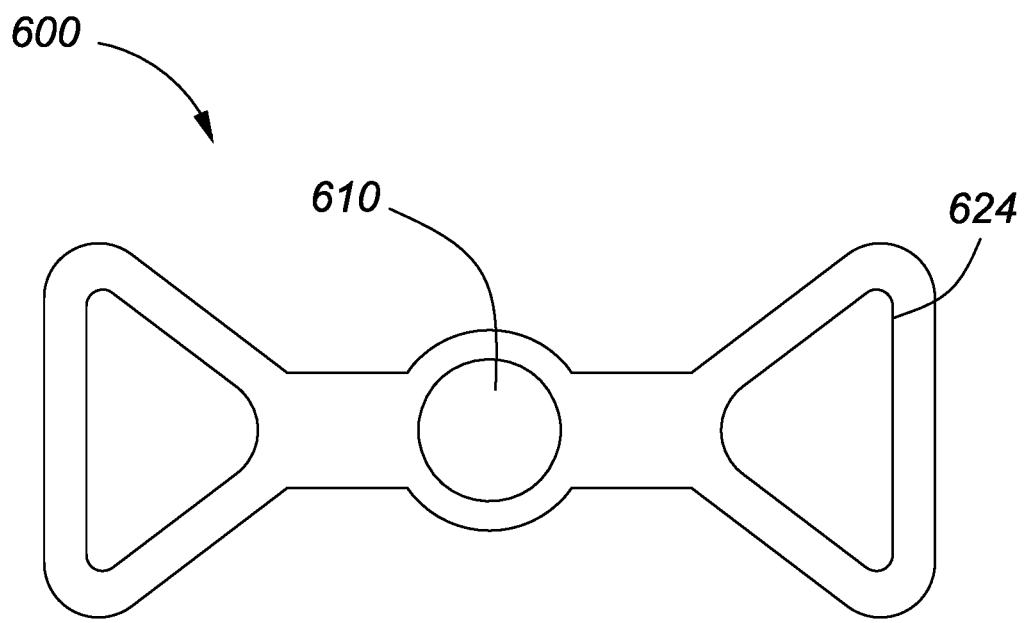
FIG. 34 shows a front view of a dual gap flexible camera adapter.

With regard to FIG. 34, a front view of a flexible adapter having two triangular gaps surrounded by generally triangular strips of flexible material that form a grip in a bowtie shape is shown. Flexible dual gap adapter 600 has a bowtie shape having two camera acceptor gaps 624. Dual gap adapter 600 is preferably comprised of silicone, which has an elasticity that allows for dual gap adapter camera holding assembly acceptor hole 610 to grip a dual gap associated camera 550. In one method of using the flexible adapter, cards such as credit cards may be held between the rear portions of the flexible adapter and the rear portion of the attached camera.

Figure 35:
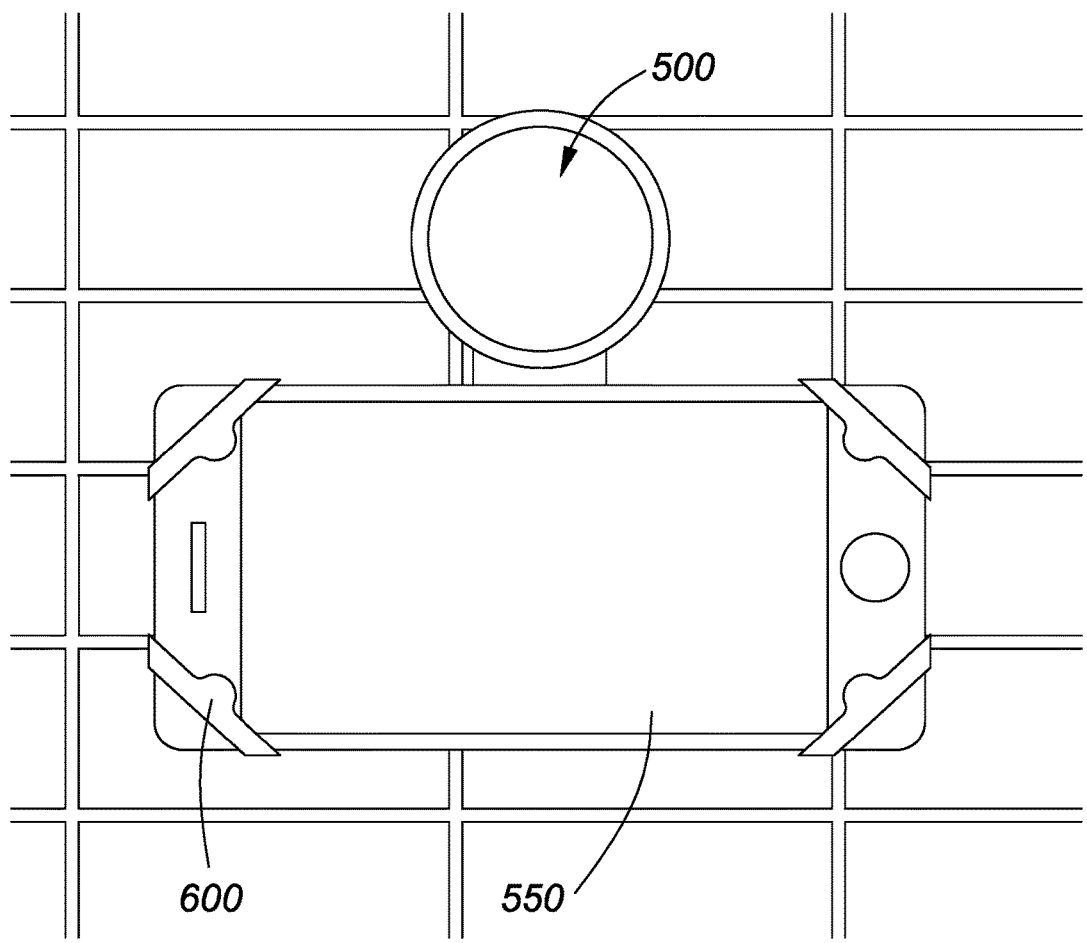
FIG. 35 shows a front view of a multi gap flexible camera adapter attached to a camera holding assembly where the dual gap flexible camera adapter is holding a camera and is attached to a wall surface.

With regard to FIG. 35, a front view of flexible adapter connecting camera holding assembly 500 is shown with flexible dual gap adapter 600 attached to dual gap associated camera 550. Flexible adapter connecting camera holding assembly 500 is shown with support attachment section 502 attached to a wall by an adhesive portion. The corners of flexible dual gap adapter 600 wrap around the corners of dual gap associated camera 550 through camera acceptor gaps 624 (shown in FIG. 34). FIG. 35, taken together with additional drawings, illustrates another embodiment of the system of the present disclosure, where the system is mounted on a wall rather than a tripod.

While preferred embodiments of this disclosure has been described above and shown in the accompanying drawings, it should be understood that applicant does not intend to be limited to the particular details described above and illustrated in the accompanying drawings, but intends to be limited only to the scope of the disclosure as defined by the following claims. In this regard, the term "configured" as used in the claims is intended to include not only the designs illustrated in the drawings of this application and the equivalent designs discussed in the text, but it is also intended to cover other equivalents now known to those skilled in the art, or those equivalents which may become known to those skilled in the art in the future.

What is claimed is:

1. A wraparound camera holder, comprising:
a flexible sheet for holding a substantially flat rectangular camera; the flexible sheet having a flexible sheet front side and a flexible sheet back side; the flexible sheet having a flexible sheet central portion and a flexible sheet outer portion; the camera having a camera front side and a camera back side; the flexible sheet outer portion containing two generally triangular grips containing two generally triangular gaps surrounded by generally triangular flexible grips for accepting a plurality of corners of the camera; wherein each generally triangular gap is configured to accept two corners of the camera; wherein the flexible sheet central portion of the flexible sheet front side contacts the camera back side and the flexible sheet outer portion of the flexible sheet back side contacts the camera front side; wherein the flexible sheet central portion comprises a circular gap for insertion of a rigid circular camera holding assembly;
the flexible sheet attached to a rigid camera attachment section; wherein a first side of the rigid camera attachment section is adapted to contact a camera and a second side of the rigid camera attachment section is removably and hingedly attached to an adhesive first side of a support attachment section when the camera holding assembly is in a closed position; and
wherein the adhesive first side of the support attachment section is adapted to contact a support when the camera holding assembly is in an open position.

2. The wraparound camera holder of claim 1, wherein the wraparound camera holder is adapted to being placed onto the camera by wrapping the wraparound camera holder around the camera.

3. The wraparound camera holder of claim 1, wherein the wraparound camera holder includes solid generally rectangular strips between the flexible sheet central portion and the triangular gaps.

4. The wraparound camera holder of claim 3, wherein the triangular gaps have a height that is less the height of a smaller side of the camera.

5. The wraparound camera holder of claim 1, wherein the wraparound camera holder has a bowtie shape.

6. The wraparound camera holder of claim 1, wherein the wraparound camera holder is adapted to holding a credit card between the camera and the wraparound camera holder.

7. A camera holding system comprising:
a camera holding assembly having a rigid camera attachment section with a camera attachment surface, and a support attachment section with a support attachment surface; wherein the rigid camera attachment and the support attachment section are connected by a hinge and fold open to form an elongate, generally planar camera holding assembly;
a flexible adapter attached to the rigid camera attachment section; wherein a first side of the rigid camera attachment section is adapted to contact a camera and a second side of the rigid camera attachment section is removably and hingedly attached to an adhesive first side of a support attachment section when the camera holding assembly is in a closed position; wherein the adhesive first side of the support attachment section is adapted to contact a support when the camera holding assembly is in an open position; wherein a second side of the support attachment section is comprised of a non-adhesive material;
the flexible adapter having a flexible sheet, which is substantially flat, for holding a rectangular camera, which is substantially flat; the flexible sheet having a flexible sheet front side and a flexible sheet back side; the flexible sheet having a flexible sheet central portion and a flexible sheet outer portion; the camera having a camera front side and a camera back side; the flexible sheet outer portion containing a plurality of gaps for accepting a plurality of corners of the camera; wherein each gap accepts at least one corner of a camera; wherein the flexible sheet central portion of the flexible sheet front side contacts the camera back side and the flexible sheet outer portion of the flexible sheet back side contacts the camera front side; wherein the flexible sheet central portion is elastically connected to the camera attachment section.

8. The camera holding system of claim 7 wherein the flexible adapter is comprised of at least one of silicone or rubber.

9. The camera holding system of claim 7, wherein the flexible sheet central portion has a same shape as the camera attachment section.

10. The camera holding system of claim 9, wherein the flexible sheet central portion is removably attached to the camera attachment section with an attachment groove.

11. A method of holding a camera comprising:
providing a central gap in a flexible adapter for holding a rectangular camera; wherein the flexible adapter is a flexible sheet having a flexible sheet central portion and a flexible sheet outer portion; the flexible sheet outer portion containing a plurality of gaps for accepting a plurality of corners of the camera;
providing a rigid, planar camera attachment section hingedly attached to a rigid, planar support attachment section;
providing an adhesive surface on a first side of the support attachment section;
concealing the adhesive surface between the camera attachment section and the support attachment section;
inserting the camera attachment section into the central gap;
wrapping the flexible camera holder around the camera;
opening a hinge between the camera attachment section and a support attachment section to expose an support adhesive surface of the support device;
attaching the support adhesive surface to a support.

12. The method of claim 11, wherein the central gap is comprised of an elastic material.

13. The method of claim 11, wherein the central gap is removably attached to the camera attachment section with an attachment groove.

14. The method of claim 11, wherein a first side of a camera attachment section, in contact with the camera, is a camera adhesive surface.

15. The method of claim 11, wherein a first side of a camera attachment section, in contact with the camera, is a magnetic surface.

\* \* \* \* \*